(12) United States Patent
Dong et al.

(10) Patent No.: US 9,391,345 B2
(45) Date of Patent: Jul. 12, 2016

(54) NON-AQUEOUS ELECTROLYTES FOR ELECTROCHEMICAL CELLS

(75) Inventors: Jian Dong, Sun Prairie, WI (US); Zhengcheng Zhang, Naperville, IL (US); Khalil Amine, Oak Brook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 1135 days.

(21) Appl. No.: 13/245,092

(22) Filed: Sep. 26, 2011

(65) Prior Publication Data
US 2012/0082890 A1   Apr. 5, 2012

Related U.S. Application Data

(60) Provisional application No. 61/388,190, filed on Sep. 30, 2010.

(51) Int. Cl.

| | |
|---|---|
| *H01M 10/0567* | (2010.01) |
| *H01M 10/0569* | (2010.01) |
| *H01M 4/133* | (2010.01) |
| *H01M 4/134* | (2010.01) |
| *H01M 6/16* | (2006.01) |
| *H01G 9/022* | (2006.01) |
| *H01G 11/58* | (2013.01) |
| *H01G 11/64* | (2013.01) |
| *H01M 2/16* | (2006.01) |
| *H01M 10/056* | (2010.01) |
| *H01M 10/0565* | (2010.01) |
| *H01M 6/14* | (2006.01) |
| *C08G 77/04* | (2006.01) |
| *C08G 77/14* | (2006.01) |
| *C08L 83/04* | (2006.01) |
| *H01M 10/052* | (2010.01) |

(52) U.S. Cl.
CPC ........... *H01M 10/0567* (2013.01); *H01G 9/038* (2013.01); *H01G 11/58* (2013.01); *H01G 11/64* (2013.01); *H01M 2/1653* (2013.01); *H01M 4/133* (2013.01); *H01M 4/134* (2013.01); *H01M 6/164* (2013.01); *H01M 6/168* (2013.01); *H01M 10/056* (2013.01); *H01M 10/0565* (2013.01); *H01M 10/0569* (2013.01); *C08G 77/045* (2013.01); *C08G 77/14* (2013.01); *C08L 83/04* (2013.01); *H01M 6/14* (2013.01); *H01M 10/052* (2013.01); *H01M 2300/0017* (2013.01); *H01M 2300/0025* (2013.01); *Y02E 60/122* (2013.01); *Y02E 60/13* (2013.01); *Y02T 10/7011* (2013.01); *Y02T 10/7022* (2013.01)

(58) Field of Classification Search
CPC ............. H01M 10/0567; H01M 10/0569; H01M 10/052; H01M 4/133; H01M 4/134; H01M 6/14; H01M 6/168; H01M 6/164; H01M 2300/17; H01M 2300/0025; Y02E 60/122; H01G 11/58

See application file for complete search history.

(56) References Cited

U.S. PATENT DOCUMENTS

| | | | |
|---|---|---|---|
| 6,416,906 | B1 | 7/2002 | Smith et al. |
| 8,034,489 | B2 | 10/2011 | Ryu et al. |
| 2004/0214090 | A1 | 10/2004 | West et al. |
| 2004/0248014 | A1 | 12/2004 | West et al. |
| 2005/0170254 | A1 | 8/2005 | West et al. |

(Continued)

OTHER PUBLICATIONS

Zhang et al. Oligo(ethylene glycol)-functionalized disiloxanes as electrolytes for lithium-ion batteries:, Journal of Power Sources Available online Dec. 23, 2009, 195(18), 6062-6068.*

(Continued)

*Primary Examiner* — Laura Weiner
(74) *Attorney, Agent, or Firm* — Foley & Lardner LLP

(57) ABSTRACT

A electrolyte for a lithium battery includes a silane/siloxane compound represented by $SiR_{4-x-y}R'_xR''_y$, by Formula II, or Formula III:

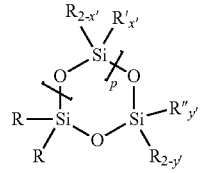

Formula II

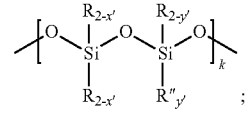

Formula III where each R is individually an alkenyl, alkynyl, alk(poly)enyl, alk(poly)ynyl, aryl; each R' is represented by;

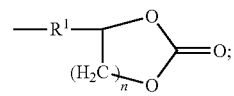

each R'' is represented by Formula I-B;

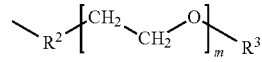

$R^1$ is an organic spacer; $R^2$ is a bond or an organic spacer; $R^3$ is alkyl or aryl; k is 1-15; m is 1-15; n is 1 or 2; p is 1-3; x' is 1-2; and y' is 0-2.

8 Claims, 7 Drawing Sheets

(56) References Cited

U.S. PATENT DOCUMENTS

| | | |
|---|---|---|
| 2006/0035154 A1 | 2/2006 | West et al. |
| 2006/0083992 A1* | 4/2006 | Nakanishi ......... H01M 10/0567 429/324 |
| 2007/0059597 A1* | 3/2007 | Nakanishi et al. ............ 429/188 |
| 2008/0044735 A1 | 2/2008 | Ryu et al. |

OTHER PUBLICATIONS

An abstract of a specific species 2,2,4,4,6,8-hexamethyl-6, 8-bis[2-(2-oxo-1, 3-dioxolan-4-yl)ethyl]-cyclotetrasiloxane, No date.*

* cited by examiner

NON-AQUEOUS ELECTROLYTES FOR ELECTROCHEMICAL CELLS

CROSS-REFERENCE TO RELATED APPLICATIONS

This application claims the benefit of U.S. Provisional Patent Application No. 61/388,190, filed on Sep. 30, 2010, the entire disclosure of which is incorporated herein by reference for any and all purposes.

GOVERNMENT RIGHTS

The United States Government has rights in this invention pursuant to Contract No. DE-AC02-06CH11357 between the United States Government and UChicago Argonne, LLC, representing Argonne National Laboratory.

FIELD

The present invention is generally directed to electrochemical cells. More particularly, the invention relates to non-aqueous electrolytes for use in electrochemical current producing cells, such as lithium ion battery, lithium-air batteries, and supercapacitors.

BACKGROUND

The following description is provided to assist the understanding of the reader. None of the information provided is admitted to be prior art to the present technology.

The use of rechargeable lithium-ion batteries in portable electronic equipment such as cell phones, PDAs, laptop computers, and implantable medical devices has continued to increase in recent years. While lithium ion batteries appear to be the battery of the future, there are increasing concerns about the safety, especially for the development of large lithium-ion batteries for Electric Vehicle (EV) and Hybrid Electric Vehicle (HEV) industries.

Aqueous electrolytes cannot be used with lithium batteries due to the reactivity of the active materials with the water. Organic electrolytes exhibit high voltages, have high ion conductivity, high dielectric constants, and low viscosity, however, they also tend to be flammable, toxic, and can react vigorously at elevated temperatures with electrode materials. Under certain conditions, lithium ion batteries may undergo thermal runaway, generating a sharp rise in temperature, and possibly resulting in fire or explosion. Organosilicon-based electrolytes, which are nonvolatile, nonflammable, and nontoxic, have received interest as an alternative electrolyte for lithium ion batteries. Organosilicon-based electrolytes have good ionic conductivities, excellent safety features and show excellent electrochemical and chemical properties in lithium ion batteries. However, shortcomings do exist that limit the commercialization of these silicon-based electrolytes. For example, the relatively low lithium conductivity and lack of a solid electrolyte interphase (SEI) formation capability on the carbon anode based lithium ion cells can be problematic.

When a organic, polar, non-aqueous solvents are used in the electrolytes of lithium ion batteries, an irreversible reaction occurs to form a passivation layer on the surface of the anodes during the initial charging cycles (i.e. the first cycles the battery undergoes). This passivation layer, or SEI, is formed on the surface of the anode. The SEI prevents the degradation of the electrolyte solution during charging and discharging, and acts as an ion tunnel. The SEI film influences the discharge capacity during subsequent cycles and influences several important aspects of battery performance such as cycle life, power capability, and self-discharge rates or shelf life and safety. Physical and chemical properties of the SEI film change according to the salt used in the electrolyte, the concentration of the salt, the composition of the solvent mixture, and other types of additives that may be used. Preferably, the SEI layer formed on the anode surface is relatively thin and of a uniform thickness. If an uneven SEI film is formed, the lithiated graphite in the active materials will react with the electrolyte components and cause decomposition of the electrolyte leading to a loss of active lithium. Accordingly, the irreversible capacity of the active material is increased and the capacity and lifetime of the battery is reduced. In the case of organosilane or organosiloxane-based electrolytes, most traditional electrolyte components, such as lithium bis(oxalate)borate (LiBOB), lithium difluoro(oxalate)borate (LiDfOB), and vinyl carbonate (VC), cannot form a uniform SEI layer. For example, when LiBOB is employed as an electrolyte additive for organosilane or organosiloxane-based electrolytes, a relatively thick SEI layer is formed on the negative electrode surface due to reductive decomposition of LiBOB on the anode. The formed thick SEI layer increases interfacial impedance inside the cell resulting in poor cyclability and poor power capability. Additionally, a too-thick SEI can't completely suppress the further decomposition of electrolyte on the anode.

Accordingly, there is a desire to develop functional electrolyte additives and materials that can reduce the interfacial resistance and improve the power capabilities of lithium ion batteries.

SUMMARY

In one aspect, a non-aqueous electrolyte is provided including an alkali metal salt; an aprotic solvent; and a silane or siloxane compound including a group represented by Formula I, where $R^1$ is an organic spacer and n is 1 or 2:

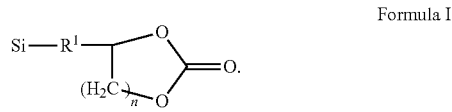

Formula I

In some embodiments, the silane or siloxane compound is represented by Formula II, III, or IV:

Formula II

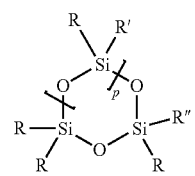

Formula III

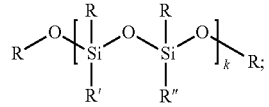

Formula IV where the silane or siloxane compound is present at a concentration from about 0.5 to about 5 weight percent of the electrolyte, each R' and R" is represented by R, Formula I-A or I-B;

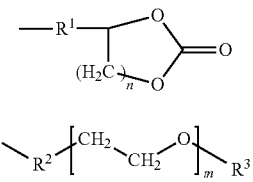

with the proviso that both R' and R" are not both R; with the proviso that both R' and R" are not both Formula I-B; each R is individually H, alkyl, alkenyl, alkynyl, alk(poly)enyl, alk(poly)ynyl, or aryl; $R^1$ is an organic spacer; $R^2$ is a bond or an organic spacer; $R^3$ is alkyl or aryl; k is 1-15; m is 0-15; n is 1 or 2; p is 1, 2, or 3; x is 1-4; and y is 0-3. In some embodiments of any of the above compounds, at least one of R' or R" is a group of Formula I-A. Such compounds are configured to form a SEI on the anode surface.

In some embodiments, $R^1$ or $R^2$ is an organic spacer, the organic spacer includes one or more alkylene groups, alkylene oxide groups, or ether groups. In some embodiments, the organic spacer is partially fluorinated or is perfluorinated.

In some embodiments, the silane or siloxane compound is represented by Formula II. In some embodiments, the silane or siloxane compound is represented by Formula III. In some embodiments, the silane or siloxane compound is represented by Formula IV.

In some embodiments, the silane or siloxane compound includes a group represented by Formula I;

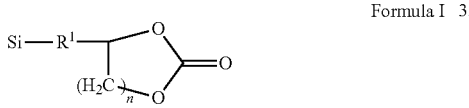

where, the silane or siloxane compound is present at a concentration from about 0.5 to about 5 weight percent of the electrolyte; $R^1$ is an alkylene, alkylene oxide other than methylene oxide, or ether; and n is 1 or 2. In some embodiments, the silane or siloxane compound is represented by Formula II: $SiR_{4-x-y}R'_xR''_y$; each R is individually an alkenyl, alkynyl, alk(poly)enyl, alk(poly)ynyl, aryl; each R' is represented by Formula I-A;

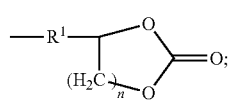

each R" is represented by Formula I-B;

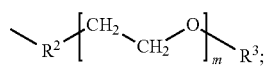

$R^2$ is a bond or an organic spacer; $R^3$ is alkyl or aryl; m is 0-15; x is 1-4; and y is 0-3. In some embodiments, the $R^1$ is partially fluorinated or is perfluorinated. In other embodiments, $R^2$ is partially fluorinated or is perfluorinated.

In some embodiments, the silane or siloxane compound is present at a concentration from about 0.5 to about 3 wt % of the electrolyte. In other embodiments, the silane or siloxane is present from about 1 to about 2 wt % At this level, the carbonate-linked silane or siloxane may form an SEI on the anode surface, but while retaining some of the carbonate-silane or siloxane in solution to aid in promoting the ionic conductivities of the electrolytes and improve the battery charge/discharge rate capabilities. Without being bound by theory, it is believes that such improvements are due to solvation of lithium ions by the carbonate.

In some embodiments, the non-aqueous electrolyte includes from 0.01 wt % to 10 wt % vinylene carbonate, fluorinated ethylene carbonate, biphenyl, biphenyl derivatives, or cyclohexyl benzene. In some embodiments, the aprotic solvent includes silicon and/or organic solvents. In some embodiments, the aprotic solvent includes a cyclic carbonate, linear carbonate, dialkyl carbonate, aliphatic carbonxylate ester, γ-lactone, linear ether, cyclic ether, or a fluorinated carboxylate ester. In some embodiments, the alkali metal salt includes $Li[(C_2O_4)_2B]$, $Li(C_2O_4)BF_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, or a lithium alkyl fluorophosphate. In some embodiments, the concentration of the alkali metal salt is from 0.5M to 2.0M.

In another aspect, an electrochemical cell is provided including a negative electrode intercalated with lithium; a positive electrode including an electrode active material which intercalates with lithium; and any of the non-aqueous electrolytes as described herein. In some embodiments, the negative electrode includes graphite particles or silicon particles. In some embodiments, the particles are microparticles or nanoparticles.

In another aspect, a compound is provided having the Formula:

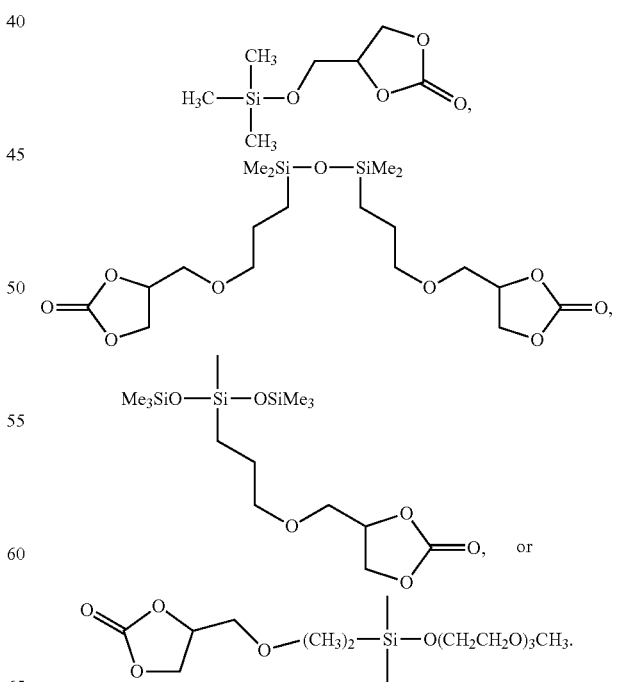

In another aspect, a compound is provided having the Formula:

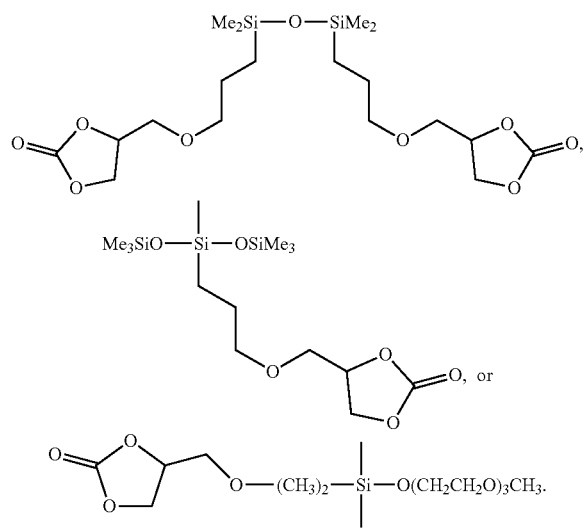

In other aspect, an electrolyte is provided including

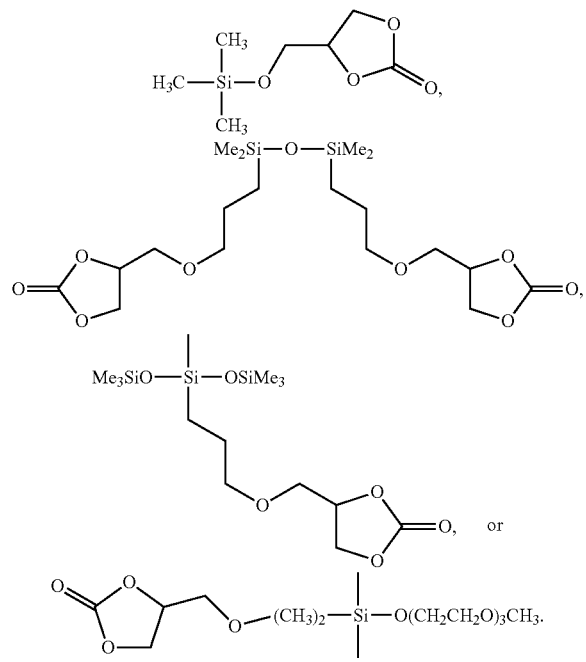

Such electrolytes may include solvents, or salts as described herein.

DETAILED DESCRIPTION

Figure 1:
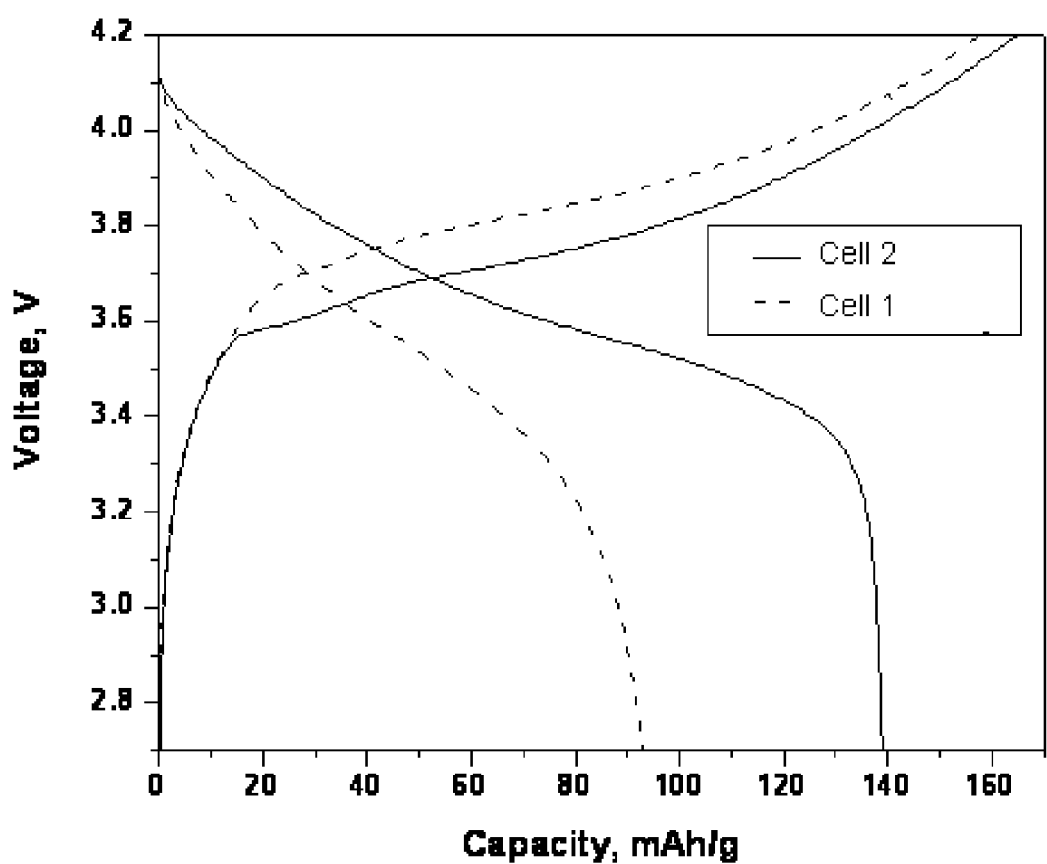
FIG. 1 is a graph illustrating the first charge/discharge voltage profiles of Cells 1 and 2, according to the examples, where the cells were cycled between 2.7 V and 4.2 V at 25° C. with a constant current of C/5.
Figure 2:
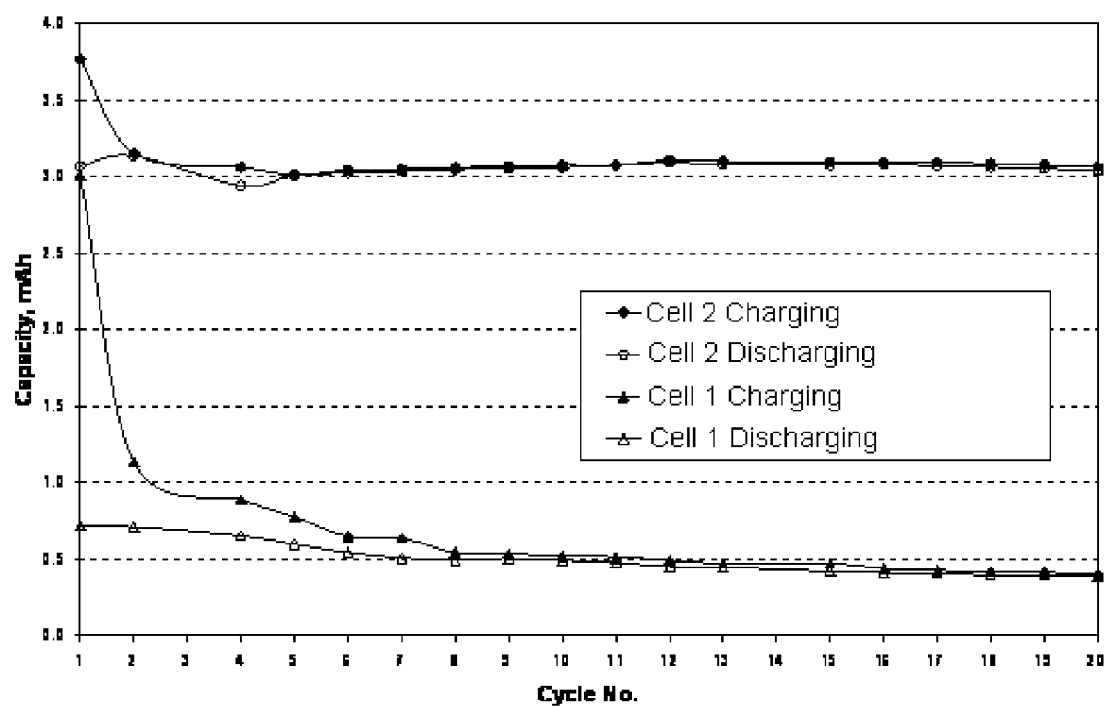
FIG. 2 is a graph illustrating capacity retention of Cells 1 and 2, according to the examples where the cells were cycled between 2.7 V and 4.2 V at 25° C. with a constant current of C/5.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, the following definitions of terms shall apply unless otherwise indicated.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In general, "substituted" refers to a group, as defined below (e.g., an alkyl or aryl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, carbonyls(oxo), carboxyls, esters, urethanes, thiols, sulfides, sulfoxides, sulfones, sulfonyls, sulfonamides, amines, isocyanates, isothiocyanates, cyanates, thiocyanates, nitro groups, nitriles (i.e., CN), and the like.

Alkyl groups include straight chain and branched alkyl groups having from 1 to 20 carbon atoms or, in some embodiments, from 1 to 12, 1 to 8, 1 to 6, or 1 to 4 carbon atoms. Alkyl groups further include cycloalkyl groups. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above. Where the term haloalkyl is used, the alkyl group is substituted with one or more halogen atoms.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 3 to 6, or 3 to 7. Cycloalkyl groups further include mono-, bicyclic and polycyclic ring systems, such as, for example bridged cycloalkyl groups as described below, and fused rings, such as, but not limited to, decalinyl, and the like. In some embodiments, polycyclic cycloalkyl groups have three rings. Substituted cycloalkyl groups may be substituted one or more times with, non-hydrogen and non-carbon groups as defined above. However, substituted cycloalkyl groups also include rings that are substituted with straight or branched chain alkyl groups as defined above. Representative substituted cycloalkyl groups may be mono-substituted or substituted more than once, such as, but not limited to, 2,2-, 2,3-, 2,4- 2,5- or 2,6-disubstituted cyclohexyl groups, which may be substituted with substituents such as those listed above.

Alkenyl groups include straight and branched chain and cycloalkyl groups as defined above, except that at least one double bond exists between two carbon atoms. Thus, alkenyl groups have from 2 to about 20 carbon atoms, and typically from 2 to 12 carbons or, in some embodiments, from 2 to 8, 2 to 6, or 2 to 4 carbon atoms. In some embodiments, alkenyl groups include cycloalkenyl groups having from 4 to 20 carbon atoms, 5 to 20 carbon atoms, 5 to 10 carbon atoms, or even 5, 6, 7, or 8 carbon atoms. Examples include, but are not limited to vinyl, allyl, CH=CH(CH$_3$), CH=C(CH$_3$)$_2$, —C(CH$_3$)=CH$_2$, —C(CH$_3$)=CH(CH$_3$), —C(CH$_2$CH$_3$) =CH$_2$, cyclohexenyl, cyclopentenyl, cyclohexadienyl, butadienyl, pentadienyl, and hexadienyl, among others. Representative substituted alkenyl groups may be mono-substituted or substituted more than once, such as, but not limited to, mono-, di- or tri-substituted with substituents such as those listed above.

Alkynyl groups include straight and branched chain alkyl groups, except that at least one triple bond exists between two carbon atoms. Thus, alkynyl groups have from 2 to about 20 carbon atoms, and typically from 2 to 12 carbons or, in some embodiments, from 2 to 8, 2 to 6, or 2 to 4 carbon atoms. Examples include, but are not limited to —C≡CH, —C≡C (CH$_3$), —C≡C(CH$_2$CH$_3$), —CH$_2$C≡CH, —CH$_2$C≡C (CH$_3$), and —CH$_2$C≡C(CH$_2$CH$_3$), among others. Representative substituted alkynyl groups may be mono-substituted or substituted more than once, such as, but not limited to, mono-, di- or tri-substituted with substituents such as those listed above.

Aryl, or arene, groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl groups, which may be substituted with substituents such as those listed above.

"Alkoxy" refers to the group —O-alkyl wherein alkyl is defined herein. Alkoxy includes, by way of example, methoxy, ethoxy, n-propoxy, isopropoxy, n-butoxy, t-butoxy, sec-butoxy, and n-pentoxy.

"Amino" refers to the group —NH$_2$. "Cyano" refers to the group —CN. "Carbonyl" refers to the divalent group —C(O)— which is equivalent to —C(=O)—. "Nitro" refers to the group —NO$_2$. "Oxo" refers to the atom (=O). "Sulfonyl" refers to the divalent group —S(O)$_2$—. "Thiol" refers to the group —SH. "Thiocarbonyl" refers to the divalent group —C(S)— which is equivalent to —C(=S)—. "Hydroxy" or "hydroxyl" refers to the group —OH.

In one aspect, an electrolyte is provided that includes a carbonate-linked silane or siloxane. The silane or siloxane is present at a concentration from about 0.5 to about 5 weight percent of the electrolyte, and the silane or siloxane may contain a group represented by Formula I:

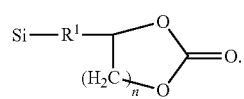

Formula I

In the group represented by Formula I, R$^1$ is an organic spacer, n is 1 or 2; and the Si is a silicon atom of the silane or siloxane. As used herein, the organic spacer may be a group that is an alkylene, alkylene oxide, or a bivalent ether group. For example, the spacer may be a alkylene group of Formula —(CH$_2$)$_q$—, where q is from 1 to 12 or larger, such as a methylene, ethylene, propylene, butylene, or like group including poly(alkylene) groups. Alternatively, the spacer may be an alkylene oxide group of Formula —[O(CH$_2$)$_q$]$_j$—, where q is from 1 to 12 or larger, and j is from 1 to 10 or larger, such as a methyleneoxy, ethyleneoxy, propyleneoxy group, butyleneoxy, or like group, including poly(alkyleneoxy) groups. Alternatively, the spacer may be a group of Formula —[O(CH$_2$)$_q$]O—, where q is from 1 to 12 or larger, and j is from 1 to 10 or larger, such as a methylene ether, ethylene ether, propylene ether, or like group, or poly(alkylene) ethers. The spacer groups may be optionally substituted. In some embodiments, the spacer is partially fluorinated. In other embodiments, the spacer is perfluorinated. In some embodiments, the compound may be silane where the Si is part of a trialkylsilyl group such as, but not limited to trimethylsilyl, or the Si may be part of a silane or siloxane ring.

In some embodiments, the silane or siloxane may be represented by any of Formulas II, III, or IV:

$$SiR_{4-x-y}R'_xR''_y \quad \text{Formula II}$$

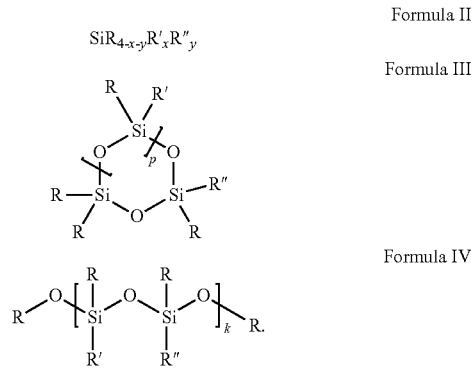

Formula III

Formula IV

In such structures of Formula I-IV, each R is independently H, alkyl, alkenyl, alkynyl, alk(poly)enyl, alk(poly)ynyl, or aryl group. In such structures of Formula I-IV, each R may individually optionally be substituted with an aryl, alkoxy, or monovalent ether group. In such structures of Formula I-IV, each R' and R" is represented by R, Formula I-A or I-B;

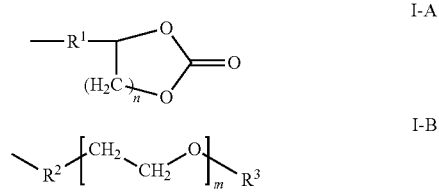

I-A

I-B with the proviso that both R' and R" are not both R and with the proviso that both R' and R" are not both Formula I-B. In such structures of Formula I-IV, R$^1$ is an organic spacer, R$^2$ is a bond or an organic spacer; and R$^3$ is alkyl or aryl. In each of the above structures, k is 1-15; p is 1, 2, or 3; x is 1-4; and y is 0-3. In some embodiments, k is 1-10; m is 1-10; n is 1; and p is 1-3.

In the electrolytes, where at least one of R' and R" includes a group of Formula I-A, the silane or siloxane is referred to as a carbonate-linked silane. In some embodiments, the carbonate-linked silane or siloxane is present in the electrolyte as a minor component from 0.5 wt % to 5 wt %. In some embodiments, the carbonate-linked silane or siloxane is present in the electrolyte as a minor component from 1 wt % to 5 wt %. In some embodiments, the carbonate-linked silane or siloxane is present in the electrolyte as a minor component from 0.5 wt % to 3 wt %. In some embodiments, the carbonate-linked silane or siloxane is present in the electrolyte as a minor component from 1 wt % to 3 wt %. The weight percentages are based on the total weight of the electrolyte solution. In such embodiments, the carbonate-linked silane or siloxane is a minor additive that can greatly improve the electrochemical cell performance, despite its low concentration in the electrolyte.

In addition to the carbonate-linked silane or siloxane, the electrolytes also include an alkali metal salt and a solvent. The alkali metal salt may be a lithium, sodium, or potassium salt. In some embodiments, the alkali metal salt is a lithium salt. Suitable lithium salts includes, but are not limited to, Li[CF$_3$CO$_2$]; Li[C$_2$F$_5$CO$_2$]; Li[ClO$_4$]; Li[BF$_4$]; Li[AsF$_6$]; Li[PF$_6$]; Li[PF$_2$(C$_2$O$_4$)$_2$]; Li[PF$_4$C$_2$O$_4$]; Li[CF$_3$SO$_3$]; Li[N(CF$_3$SO$_2$)$_2$]; Li[C(CF$_3$SO$_2$)$_3$]; Li[N(SO$_2$C$_2$F$_5$)$_2$]; lithium alkyl fluorophosphates; Li[B(C$_2$O$_4$)$_2$]; Li[BF$_2$C$_2$O$_4$]; Li$_2$[B$_{12}$X$_{12-n}$H$_n$]; or Li$_2$[B$_{10}$X$_{10-b}$H$_n$], where X is a halogen and n is from 0 to 12. In some embodiments, the lithium salt is a lithium (chelato)borate such as Li[(C$_2$O$_4$)$_2$B] or Li[(C$_2$O$_4$)BF$_2$]. In some embodiments, the alkali metal salt is other than a Li[(C$_2$O$_4$)$_2$B] or Li(C$_2$O$_4$)BF$_2$ and the electrolyte further includes Li[(C$_2$O$_4$)$_2$B] or Li(C$_2$O$_4$)BF$_2$.

The alkali metal salts are used at a concentration sufficient to support electrical conductivity within the cell. In some embodiments, the concentration is greater than 0.5 M. In some embodiments, the ionic electrolyte salt is present from about 0.01 M to about 2 M, from about 0.05 M to about 1.5 M, or from about 0.4 M to about 1.0 M. Where the alkali metal salt is other than Li[(C$_2$O$_4$)$_2$B] or Li(C$_2$O$_4$)BF$_2$, but the electrolyte further includes Li[(C$_2$O$_4$)$_2$B] or Li(C$_2$O$_4$)BF$_2$, the Li[(C$_2$O$_4$)$_2$B] or Li[(C$_2$O$_4$)BF$_2$], or a mixture thereof is present from 0.001 wt % to 8 wt %.

Illustrative examples of suitable solvents include, but are not limited to, propylene carbonate, ethylene carbonate, dimethyl carbonate, ethyl methyl carbonate, diethyl carbonate, methyl propyl carbonate, ethyl propyl carbonate, dipropyl carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, and γ-butyrolactone. In some embodiments, the solvent is propylene carbonate or ethylene carbonate. In some embodiments, the solvent is propylene carbonate. In some instances, the solvent is other than a siloxane or silane.

In some embodiments, the electrolyte may also include organosilicon-based solvents such as, but not limited to, oligo (ethylene glycol) functionalized silanes as represented by Formulas X-A, X-B, X-C, X-D, X-E, or X-F:

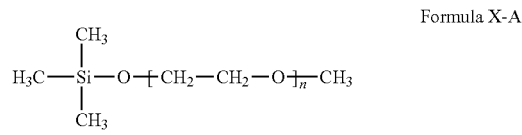

Formula X-A

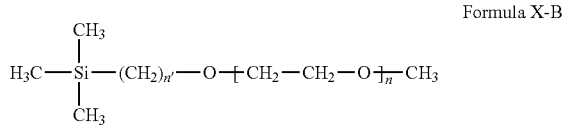

Formula X-B

-continued

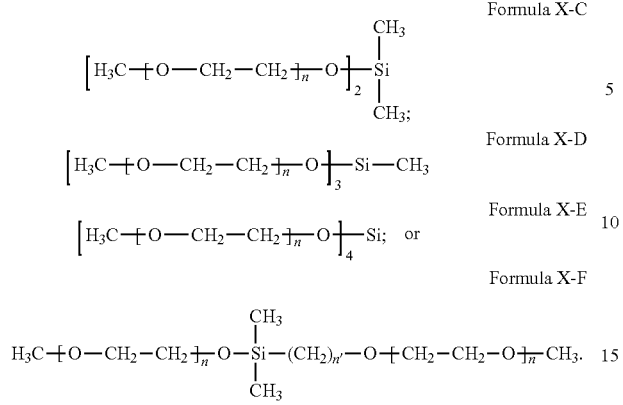

In Formulas X-A, X-B, X-C, X-D, X-E, and X-F each n is individually an integer from 1 to 15 (e.g. 1, 2, 3, 4, 5, 6, 7, 8, 9, 10, 11, 12, 13, 14, or 15). In some embodiments, each n is individually an integer from 2 to 15. In some embodiments, n is three. In some embodiments of Formulas X-A, X-B, X-C, X-D, X-E, and X-F, each n' is an integer selected from one, two, or three. In other embodiments, each n' is one or three.

In such embodiments, the organosilicon-based solvent may include those of formulas $(CH_3)_3SiO(CH_2CH_2O)_nCH_3$; $(CH_3)_3SiCH_2O(CH_2CH_2O)_nCH_3$; $(CH_3)_3Si(CH_2)_3O(CH_2CH_2O)_nCH_3$; $(CH_3)_2Si[O(CH_2CH_2O)_nCH_3]_2$; $CH_3Si[O(CH_2CH_2O)_pCH_3]_3$; $Si[O(CH_2CH_2O)_pCH_3]_4$; $(CH_3)_2Si[O(CH_2CH_2O)_nCH_3][(CH_2)_3O(CH_2CH_2O)_nCH_3]$; or $(CH_3)_3SiOR$; $(CH_3)_3Si(CH_2)_3OR$; where R is a carbonate group, n is 2, 3, 4, 5, 6, or 7; n' is 2, 3, 4, or 5; p is 2, 3, or 4; and p' is 2 or 3. Specific examples, include, but are not limited to $(CH_3)_3SiO(CH_2CH_2O)_2CH_3$; $(CH_3)_3SiO(CH_2CH_2O)_3CH_3$; $(CH_3)_3SiO(CH_2CH_2O)_4CH_3$; $(CH_3)_3SiO(CH_2CH_2O)_5CH_3$; $(CH_3)_3SiO(CH_2CH_2O)_6CH_3$; $(CH_3)_3SiO(CH_2CH_2O)_7CH_3$; $(CH_3)_3SiCH_2O(CH_2CH_2O)_2CH_3$; $(CH_3)_3SiCH_2O(CH_2CH_2O)_3CH_3$; $(CH_3)_3SiCH_2O(CH_2CH_2O)_4CH_3$; $(CH_3)_3SiCH_2O(CH_2CH_2O)_5CH_3$; $(CH_3)_3SiCH_2O(CH_2CH_2O)_6CH_3$; $(CH_3)_3SiCH_2O(CH_2CH_2O)_7CH_3$; $(CH_3)_3Si(CH_2)_3O(CH_2CH_2O)_2CH_3$; $(CH_3)_3Si(CH_2)_3O(CH_2CH_2O)_3CH_3$; $(CH_3)_3Si(CH_2)_3O(CH_2CH_2O)_4CH_3$; $(CH_3)_3Si(CH_2)_3O(CH_2CH_2O)_5CH_3$; $(CH_3)_2Si[O(CH_2CH_2O)_2CH_3]_2$; $(CH_3)_2Si[O(CH_2CH_2O)_3CH_3]_2$; $(CH_3)_2Si[O(CH_2CH_2O)_4CH_3]_2$; $(CH_3)_2Si[O(CH_2CH_2O)_5CH_3]_2$; $CH_3Si[O(CH_2CH_2O)_2CH_3]_3$; $CH_3Si[O(CH_2CH_2O)_3CH_3]_3$; $CH_3Si[O(CH_2CH_2O)_4CH_3]_3$; $Si[O(CH_2CH_2O)_2CH_3]_4$; $Si[O(CH_2CH_2O)_3CH_3]_4$; $(CH_3)_2Si[O(CH_2CH_2O)_2CH_3][(CH_2)_3O(CH_2CH_2O)_2CH_3]$; $(CH_3)_2Si[O(CH_2CH_2O)_3CH_3][(CH_2)_3O(CH_2CH_2O)_3CH_3]$; $(CH_3)_2Si[O(CH_2CH_2O)_4CH_3][(CH_2)_3O(CH_2CH_2O)_4CH_3]$; or $(CH_3)_2Si[O(CH_2CH_2O)_5CH_3][(CH_2)_3O(CH_2CH_2O)_5CH_3]$.

In one embodiment, the non-aqueous electrolyte solvent includes a disiloxane compound. Suitable disiloxanes include a backbone with a first silicon and a second silicon. The first silicon is linked to a first substituent that includes an oligo (alkylene glycol) moiety or a cyclic carbonate moiety. For instance, the first silicon can be selected from a group consisting of a first side-chain that includes an oligo(alkylene glycol) moiety, a first side-chain that includes a cyclic carbonate moiety or a cross-linker that includes a oligo(alkylene glycol) moiety which cross-links the disiloxane to a second siloxane. In some instances, the disiloxanes include no more than one oligo(alkylene glycol) moiety and/or no more than one cyclic carbonate moiety. For instance, the entities linked to the first silicon and the second silicon, other than the first substituent, can each exclude an oligo(alkylene glycol) moiety and/or a cyclic carbonate moiety. In some instances, the disiloxane excludes an oligo(alkylene glycol) moieties or excludes cyclic carbonate moieties. In some embodiments, the inorganic salt is a lithium salt.

The second silicon can be linked to a second substituent that is a second side-chain that includes an oligo(alkylene glycol) moiety and a second side-chain that includes a cyclic carbonate moiety. In some instances, the disiloxanes include no more than two oligo(alkylene glycol) moieties and/or no more than two cyclic carbonate moieties. For instance, the entities linked to the first silicon and the second silicon, in addition to the first substituent and the second substituent, can each include an oligo(alkylene glycol) moiety and/or a cyclic carbonate moiety.

In some embodiments, the disiloxanes are represented by Formula XI:

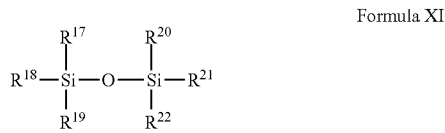

Formula XI where $R^{17}$, $R^{19}$, $R^{20}$, and $R^{22}$ are individually an alkyl group or an aryl group; $R^{18}$ is an alkyl group, an aryl group, an oligo(alkylene glycol) group, or an alkylcyclic carbonate group; and $R^{21}$ is an alkyl group, an aryl group, an oligo (alkylene glcycol) group, an alkylcyclic carbonate group, Group I, Group II, or Group III. In some embodiments, $R^{18}$ is selected from Group I, Group II, or Group III. In other embodiments, $R^{21}$ is an alkyl group, an aryl group, Group I, or Group III. In some embodiments, $R^{21}$ is selected from Group I or Group III. In some embodiments, $R^{18}$ is selected from an alkyl group, an aryl group, or Group I. In other embodiments, $R^{18}$ is an alkyl, an aryl, or Group III. In some embodiments, $R^{17}$, $R^{19}$, $R^{20}$, and $R^{22}$ are individually an alkyl group. For example, $R^{17}$, $R^{19}$, $R^{20}$, and $R^{22}$ may individually be a methyl, ethyl, n-propyl, iso-propyl, n-butyl, iso-butyl, or tert-butyl group. In some embodiments, $R^{17}$, $R^{19}$, $R^{20}$, and $R^{22}$ are each a methyl group.

As used herein, Groups I-IV are as follows:

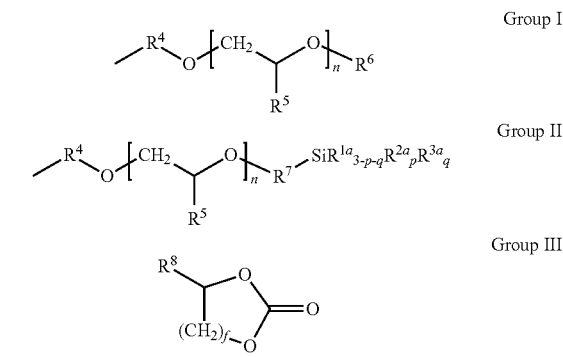

where each $R^{1a}$ is individually an alkyl group, alkenyl group, alkynyl group, alk(poly)enyl group, alk(poly)enyl group, or aryl group; each $R^{2a}$ is individually a group of Group I or Group II; each $R^{3a}$ is individually a group of Group I or Group III; x is 1, 2, 3, or 4; y is 0, 1, 2, or 3; the sum of x and y is greater than or equal to one; each $R^4$ is individually a bond or a divalent spacer; each $R^5$ and $R^6$ are individually hydrogen, alkyl, or aryl; each $R^7$ is individually alkyl or aryl; $R^8$ is a divalent organic spacer; f is 1 or 2; n is an integer from 0 to 15; p is 0, 1, 2, or 3; and q is 0, 1, 2, or 3.

In one example of the disiloxane, the first substituent is a side chain that includes an oligo(alkylene glycol) moiety. The oligo(alkylene glycol) moiety can include an oxygen linked directly to the first silicon. For instance, the disiloxanes can be represented by Formula XI, where $R^{21}$ is a Group I, and $R^{12}$ is a bond. Alternately, a spacer can link the oligo(alkylene glycol) moiety to the first silicon. For instance, the disiloxanes can be represented by Formula V, where $R^{21}$ is Group I, and $R^{12}$ is a divalent organic moiety.

Where the first substituent is a side chain that includes an oligo(alkylene glycol) moiety, each of the entities linked to the second silicon can be alkyl groups and/or aryl groups. For instance, the second substituent can be an alkyl group or an aryl group. In some embodiments, the disiloxane is a compound of Formula XI, where $R^{21}$ is Group I, and $R^{18}$ is an alkyl group or an aryl group.

Exemplary compounds of Formula XI, include, but are not limited to:

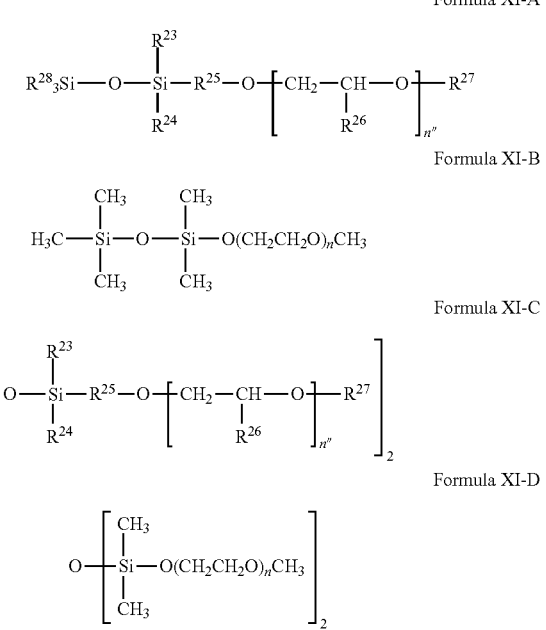

In the above compounds of Formulas XI-A, XI-B, XI-C, and XI-D, each $R^{23}$ and $R^{24}$ are individually an alkyl group or an aryl group; each $R^{25}$ is a bond or a divalent spacer; each $R^{26}$ is individually a hydrogen atom or an alkyl group; each $R^{27}$ is individually an alkyl group; each $R^{28}$ is individually an alkyl or an aryl group; n is an integer from 0 to 15, and n" is an integer from 1 to 30. In some embodiments, n is an integer from 1 to 12. Where $R^{25}$ is a divalent spacer, it may be an organic divalent spacer, such as an alkylene, an alkylene glycol, or a bivalent ether group. For example, $R^{25}$ may be a moiety having one or more methylene groups. In some embodiments, $R^{25}$ is methylene, ethylene, propylene, or butylene. In one embodiment, $R^{25}$ is $-(CH_2)_3-$. In some embodiments, $R^{25}$ may be partially or completely halogenated. For instance, the above spacers can be completely or partially fluorinated. In some embodiments, each $R^{28}$ is individually an alkyl group. For example, each $R^{28}$ may individually be a methyl, ethyl, n-propyl, iso-propyl, n-butyl, iso-butyl, or tert-butyl group. In some embodiments, each $R^{31}$ is a methyl group. In one embodiment, each $R^{28}$ is a methyl, $R^{25}$ is $-(CH_2)_3-$; and $R^{26}$ is a hydrogen. In one embodiment, each $R^{28}$ is a methyl; $R^{25}$ is $-(CH_2)_3-$; and $R^{26}$ is a hydrogen; and n is 3. In some embodiments, n is 3.

In some embodiments, the disiloxane compound is a compound of formula $CH_3O(CH_2CH_2O)_nSi(CH_3)_2OSi(CH_3)_2O$ $(CH_3)_2SiO(CH_2CH_2O)_nCH_3$; $CH_3O(CH_2CH_2O)_n(CH_2)_3Si$ $(CH_3)_2OSi(CH_3)_2O(CH_3)_2Si(CH_2)_3O(CH_3)_2Si(CH_2CH_2)_nOCH_3$; $[(CH_3)_3SiO]_2Si(CH_3)O(CH_2CH_2O)_nCH_3$; $[(CH_3)_3SiO]_2Si(CH_3)(CH_2)_3O(CH_2CH_2O)_nCH_3$; $[(CH_3)_3SiO]_2Si(CH_3)O(CH_2CH_2O)_n(CH_3)Si[OSi(CH_3)_3]_2$; $R-OSi(CH_3)_2OSi(CH_3)_2O(CH_3)_2SiO-R$; $R-OSi(CH_3)_2OSi(CH_3)_2OSi(CH_3)_3$; $R-O(CH_2)_3Si(CH_3)_2OSi(CH_3)_2O(CH_3)_2Si(CH_2)_3O-R$; $R-O(CH_2)_3Si(CH_3)_2OSi(CH_3)_2O-Si(CH_3)_3$; $R-OSi(CH_3)_2OSi(CH_3)_2O(CH_3)_2SiO(CH_2CH_2)_nCH_3$; or $R-O(CH_2)_3Si(CH_3)_2O-Si(CH_3)_2O(CH_3)_2Si(CH_2)_3O(CH_2CH_2)_nCH_3$; where n is 2, 3, 4, 5, 6, or 7; and R is a carbonate group. Specific examples may include; but are not limited to $CH_3O(CH_2CH_2O)_2Si(CH_3)_2O(CH_3)_2SiO(CH_2CH_2O)_2CH_3$; $CH_3O(CH_2CH_2O)_3Si(CH_3)_2O(CH_3)_2SiO(CH_2CH_2O)_3CH_3$; $CH_3O(CH_2CH_2O)_4Si(CH_3)_2O(CH_3)_2SiO(CH_2CH_2O)_4-CH_3$; $CH_3O(CH_2CH_2O)_5Si(CH_3)_2O(CH_3)_2SiO(CH_2CH_2O)_5CH_3$; $CH_3O(CH_2CH_2O)_6Si(CH_3)_2O(CH_3)_2SiO(CH_2CH_2O)_6CH_3$; $CH_3O(CH_2CH_2O)_7Si(CH_3)_2O(CH_3)_2SiO(CH_2CH_2O)_7CH_3$; $CH_3O(CH_2CH_2O)_2CH_2-Si(CH_3)_2O(CH_3)_2Si-CH_2O(CH_2CH_2O)_2CH_3$; $CH_3O(CH_2CH_2O)_2CH_2-Si(CH_3)_3O(CH_3)_2Si-CH_2O(CH_2CH_2O)_3CH_3$; $CH_3O(CH_2CH_2O)_4CH_2Si(CH_3)_2O(CH_3)_2SiCH_2O(CH_2CH_2O)_4-CH_3$; $CH_3O(CH_2CH_2O)_5CH_2Si(CH_3)_2O(CH_3)_2SiCH_2O(CH_2CH_2O)_5CH_3$; $CH_3O(CH_2CH_2O)_6CH_2-Si(CH_3)_2O(CH_3)_2SiCH_2O(CH_2CH_2O)_6CH_3$; $CH_3O(CH_2CH_2O)_7CH_2Si(CH_3)_2O(CH_3)_2Si-CH_2O(CH_2CH_2O)_7CH_3$; $CH_3O(CH_2CH_2O)_2(CH_2)_3-Si(CH_3)_2O(CH_3)_2Si-(CH_2)_3O(CH_2CH_2O)_2CH_3$; $CH_3O(CH_2CH_2O)_3(CH_2)_3-Si(CH_3)_2O(CH_3)_2Si-(CH_2)_3O(CH_2CH_2O)_3CH_3$; $CH_3O(CH_2CH_2O)_4(CH_2)_3-Si(CH_3)_2O(CH_3)_2Si-(CH_2)_3O(CH_2CH_2O)_4CH_3$; $CH_3O(CH_2CH_2O)_5(CH_2)_3-Si(CH_3)_2O(CH_3)_2Si-(CH_2)_3O(CH_2CH_2O)_5CH_3$; $CH_3O(CH_2CH_2O)_6(CH_2)_3-Si(CH_3)_2O(CH_3)_2Si-(CH_2)_3O(CH_2CH_2O)_6CH_3$; $CH_3O(CH_2CH_2O)_7(CH_2)_3-Si(CH_3)_2O(CH_3)_2Si-(CH_2)_3O(CH_2CH_2O)_7CH_3$; $(CH_3)_3SiO(CH_3)_2Si-(CH_2)_3O(CH_2CH_2O)_2CH_3$; $(CH_3)_3SiO(CH_3)_2Si-(CH_2)_3O(CH_2CH_2O)_3CH_3$; $(CH_3)_3SiO(CH_3)_2Si-(CH_2)_3O(CH_2CH_2O)_4CH_3$; $(CH_3)_3SiO(CH_3)_2SiO(CH_2)_3O(CH_2CH_2O)_5CH_3$; $(CH_3)_3SiO(CH_3)_2Si-(CH_2)_3O(CH_2CH_2O)_6CH_3$; $(CH_3)_3SiO(CH_3)_2SiO(CH_2)_2O(CH_2CH_2O)_7CH_3$; $(CH_3)_3SiO(CH_3)_2Si-(CH_2)_2O(CH_2CH_2O)_2CH_3$; $(CH_3)_3SiO(CH_3)_2Si-(CH_2)_2O(CH_2CH_2O)_3CH_3$; $(CH_3)_3SiO(CH_3)_2Si-(CH_2)_2O(CH_2CH_2O)_4CH_3$; $(CH_3)_3SiO(CH_3)_2Si-(CH_2)_2O(CH_2CH_2O)_5CH_3$; $(CH_3)_3SiO(CH_3)_2Si-(CH_2)_2O(CH_2CH_2O)_6CH_3$; $(CH_3)_3SiO(CH_3)_2Si-(CH_2)_2O(CH_2CH_2O)_7CH_3$; $(CH_3)_3SiO(CH_3)_2SiO(CH_2CH_2O)_2CH_3$; $(CH_3)_3SiO(CH_3)_2SiO(CH_2CH_2O)_3CH_3$; $(CH_3)_3SiO(CH_3)_2SiO(CH_2CH_2O)_4CH_3$; $(CH_3)_3SiO(CH_3)_2SiO(CH_2CH_2O)_5CH_3$; $(CH_3)_3SiO(CH_3)_2SiO(CH_2CH_2O)_6CH_3$; and $(CH_3)_3SiO(CH_3)_2SiO(CH_2CH_2O)_7CH_3$; or a mixture of any two or more such compounds.

In some embodiments, the non-aqueous electrolyte solvent includes a trisiloxane compound. Some such trisiloxanes may be represented by general Formula XII:

Formula XII

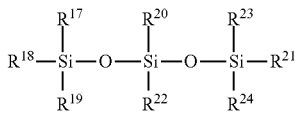

where $R^{17}$, $R^{19}$, $R^{20}$, $R^{21}$, $R^{23}$ and $R^{24}$ are individually an alkyl group or an aryl group; $R^{10}$ is an alkyl group, an aryl group, an oligo(alkylene glycol) group, or an alkylcyclic carbonate group; and $R^{21}$ is an alkyl group, an aryl group, an oligo(alkylene glcycol) group, or an alkylcyclic carbonate group. In some embodiments, $R^{18}$ is selected from Group I, Group II, or Group III. In other embodiments, $R^{21}$ is an alkyl group, an aryl group, Group I, or Group III. In some embodiments, $R^{21}$ is selected from Group I or Group III. In some embodiments, $R^{18}$ is selected from an alkyl group, an aryl group, or Group I. In other embodiments, $R^{18}$ is an alkyl, an aryl, or Group III. In some embodiments, $R^{17}$, $R^{19}$, $R^{20}$, $R^{21}$, $R^{23}$ and $R^{24}$ are individually an alkyl group. For example, $R^{17}$, $R^{19}$, $R^{20}$, $R^{21}$, $R^{23}$ and $R^{24}$ may individually be a methyl, ethyl, n-propyl, iso-propyl, n-butyl, iso-butyl, or tert-butyl group. In some embodiments, $R^{17}$, $R^{19}$, $R^{20}$, $R^{21}$, $R^{23}$ and $R^{24}$ are each a methyl group.

Representative trisiloxanes of Formula VI include, but are not limited to, those compounds described by Formulas XII-A or XII-B.

Formula XII-A

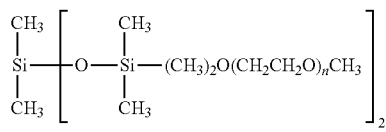

Formula XII-B

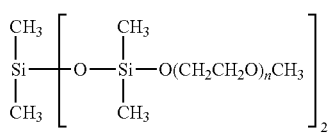

In each of the formulas, each n is independently an integer from 1 to 12 and f is 1 or 2.

In each of Formulas XII-A and XII-B, a trisiloxane having terminal silicon atoms linked to a side chain that includes a poly(ethylene oxide) moiety are shown. Formula XII-A illustrates an organic spacer positioned between each poly(ethylene oxide) moiety and the terminal silicon. Formula XII-B illustrates each of the terminal silicon atoms linked directly to a poly(ethylene oxide) moiety.

In other embodiments, the trisiloxanes are compounds according to Formula XIII.

Formula XIII

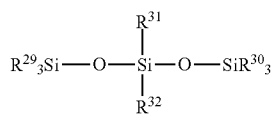

where each $R^{29}$, $R^{30}$, and $R^{31}$ are individually an alkyl group or an aryl group; and $R^{32}$ is selected from Group I, Group II, or Group III.

Representative compounds of Formula XIII include, but are not limited to compounds such as those of Formulas XIII-A, XIII-B, XIII-C and XIII-D.

Formula XIII-A

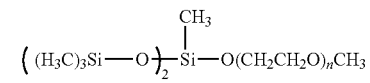

Formula XIII-B

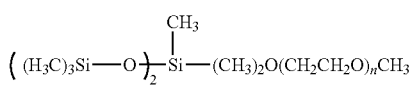

Formula XIII-C

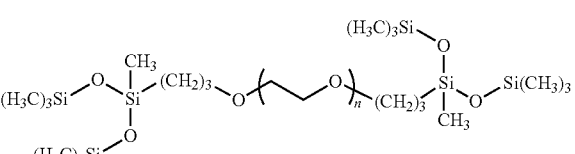

Formula XIII-D

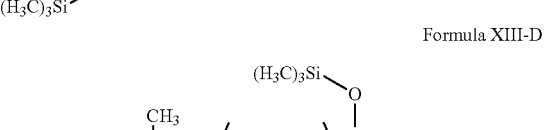

In each of the formulas, each n is independently an integer from 1 to 12.

Formula XIII-A illustrates a trisiloxane where the central silicon atom is directly linked to a side chain that includes a poly(ethylene oxide). Formulas XIII-C and XIII-D illustrate trisiloxanes having a central silicon atom linked through a cross-link (e.g. the poly(alkylene oxide) moiety) joining the trisiloxane to a second trisiloxane. Formula XIII-C illustrates the cross-link including a spacer positioned between the poly(alkylene oxide) moiety and each of the trisiloxanes. Formula XIII-D illustrates a silicon atom in the backbone of each trisiloxane linked directly to a poly(alkylene oxide) moiety.

In some embodiments, the trisiloxane is $CH_3O(CH_2CH_2O)_2Si(CH_3)_2OSi(CH_3)_2O(CH_3)_2SiO(CH_2CH_2O)_2CH_3$; $CH_3O(CH_2CH_2O)_3Si(CH_3)_2OSi(CH_3)_2O(CH_3)_2SiO(CH_2CH_2O)_3CH_3$; $CH_3O(CH_2CH_2O)_4Si(CH_3)_2OSi(CH_3)_2O(CH_3)_2SiO(CH_2CH_2O)_4CH_3$; $CH_3O(CH_2CH_2O)_5Si(CH_3)_2OSi(CH_3)_2O(CH_3)_2SiO(CH_2CH_2O)_5CH_3$; $CH_3O(CH_2CH_2O)_6Si(CH_3)_2OSi(CH_3)_2O(CH_3)_2SiO(CH_2CH_2O)_6CH_3$; $CH_3O(CH_2CH_2O)_7Si(CH_3)_2OSi(CH_3)_2O(CH_3)_2SiO(CH_2CH_2O)_7CH_3$; $CH_3O(CH_2CH_2O)_2(CH_2)_3Si(CH_3)_2OSi(CH_3)_2O(CH_3)_2Si(CH_2)_3O(CH_3)_2SiO(CH_2CH_2O)_2CH_3$; $CH_3O(CH_2CH_2O)_3(CH_2)_3Si(CH_3)_2OSi(CH_3)_2O(CH_3)_2Si(CH_2)_3O(CH_3)_2SiO(CH_2CH_2O)_3CH_3$; $CH_3O(CH_2CH_2O)_4(CH_2)_3Si(CH_3)_2OSi(CH_3)_2O(CH_3)_2Si(CH_2)_3O(CH_3)_2SiO(CH_2CH_2O)_4CH_3$; $CH_3O(CH_2CH_2O)_5(CH_2)_3Si(CH_3)_2OSi(CH_3)_2O(CH_3)_2Si(CH_2)_3O(CH_3)_2SiO(CH_2CH_2O)_5CH_3$; $[(CH_3)_3SiO]_2Si(CH_3)O(CH_2CH_2O)_2CH_3$; $[(CH_3)_3SiO]_2Si(CH_3)O(CH_2CH_2O)_3CH_3$; $[(CH_3)_3SiO]_2Si(CH_3)O(CH_2CH_2O)_4CH_3$; $[(CH_3)_3SiO]_2Si(CH_3)O(CH_2CH_2O)_5CH_3$; $[(CH_3)_3SiO]_2Si(CH_3)O(CH_2CH_2O)_6CH_3$; $[(CH_3)_3SiO]_2Si(CH_3)O(CH_2CH_2O)_7CH_3$; $[(CH_3)_3SiO]_2Si(CH_3)(CH_2)_3O(CH_2CH_2O)_2CH_3$; $[(CH_3)_3SiO]_2Si(CH_3)(CH_2)_3O(CH_2CH_2O)_3CH_3$; $[(CH_3)_3SiO]_2Si(CH_3)(CH_2)_3O(CH_2CH_2O)_4CH_3$; $[(CH_3)_3SiO]_2Si(CH_3)(CH_2)_3O(CH_2CH_2O)_5CH_3$; $[(CH_3)_3SiO]_2Si(CH_3)(CH_2)_3O(CH_2CH_2O)_6CH_3$; $[(CH_3)_3SiO]_2Si(CH_3)(CH_2)_3O(CH_2CH_2O)_7CH_3$; $[(CH_3)_3SiO]_2Si(CH_3)O(CH_2CH_2O)_2(CH_3)Si[OSi(CH_3)_3]_2$; $[(CH_3)_3SiO]_2Si(CH_3)O(CH_2CH_2O)_3(CH_3)Si[OSi(CH_3)_3]_2$; $[(CH_3)_3SiO]_2Si(CH_3)O(CH_2CH_2O)_4(CH_3)Si[OSi(CH_3)_3]_2$; $[(CH_3)_3SiO]_2Si(CH_3)O(CH_2CH_2O)_5$ $(CH_3)Si[OSi(CH_3)_3]_2$; $[(CH_3)_3SiO]_2Si(CH_3)O(CH_2CH_2O)_6$ $(CH_3)Si[OSi(CH_3)_3]_2$; $[(CH_3)_3SiO]_2Si(CH_3)O(CH_2CH_2O)_7$ $(CH_3)Si[OSi(CH_3)_3]_2$; R—$OSi(CH_3)_2OSi(CH_3)_2$ $O(CH_3)_2SiO$—R; R—$OSi(CH_3)_2OSi(CH_3)_2OSi(CH_3)_3$; R—$O(CH_2)_3Si(CH_3)_2OSi(CH_3)_2O(CH_3)_2Si(CH_2)_3O$—R; R—$O(CH_2)_3Si(CH_3)_2OSi(CH_3)_2OSi(CH_3)_3$; R—$OSi(CH_3)_2OSi(CH_3)_2O(CH_3)_2SiO(CH_2CH_2)_nCH_3$; R—$O(CH_2)_3Si(CH_3)_2OSi(CH_3)_2O(CH_3)_2Si(CH_2)_3O(CH_2CH_2)_nCH_3$; or a mixture of any two or more such compounds, where n is 2, 3, 4, 5, 6, or 7, and R is a carbonate group.

Where the carbonate-linked silane or siloxane is a polysilane or siloxane, lower oligomeric silanes or siloxanes may be used in the electrolyte to reduce the viscosity of the electrolyte and improve both electrode wetting properties and the capacity and cycling properties of electrochemical cells produced with the electrolytes. For example, such lower oligomeric silanes or siloxanes may include, tetrasilanes/siloxanes, trisilanes/siloxanes, and disilanes/siloxanes where the structural functionality is similar to that of the polysilanes/siloxanes, but at a much reduced molecular weight. Such materials may also provide an electrolyte with high ionic conductivities in addition to enhanced cycling properties. For instance, one or more of the silicon atoms in the material can each be linked to a first substituent that includes an alkylene oxide moiety and/or cyclic carbonate moiety. The alkylene oxide and/or cyclic carbonate moieties can help dissolve lithium salts employed in the electrolyte. Accordingly, such tetrasilanes/siloxanes, trisilanes/siloxanes, and disilanes/siloxanes can provide an electrolyte with a concentration of free ions suitable for use in batteries. Additionally, the alkylene oxide and/or cyclic carbonate moieties can enhance the ionic conductivity of the electrolyte at room temperatures.

In other embodiments, the electrolyte includes other additives to further improve the cycle life or the calendar life of the cell. For example, one class of illustrative additives includes, but is not limited to, carbonates having one or more unsaturated substituents. Illustrative carbonates include, but are not limited to, unsaturated and unsubstituted cyclic carbonates such as vinyl carbonate (VC); cyclic alkylene carbonates having one or more unsaturated substituents, such as vinyl ethylene carbonate (VEC), and o-phenylene carbonate; cyclic alkylene carbonates having one or more halogenated alkyl substituents, such as ethylene carbonate substituted with a trifluoromethyl group (trifluoropropylene carbonate, TFPC); linear carbonates having one or more unsaturated substituents such as ethyl 2-propenyl ethyl carbonate ($C_2H_5CO_3C_3H_5$); saturated or unsaturated halogenated cyclic alkylene carbonates such as fluoroethylene carbonate (FEC) and chloroethylene carbonate (ClEC).

In other embodiments, other suitable additives include, but are not limited to, acetates having one or more unsaturated substituents such as vinyl acetate (VA); cyclic alkyl sulfites and linear sulfites, such as ethylene sulfite (ES), propylene sulfite (PS), dimethyl sulfite (DMS), diethyl sulfite (EDS); halogenated γ-butyrolactones, such as bromo-γ-butyrolactone (BrGBL), and fluoro γ-butyrolactone (FGBL); other carbonates, such as vinylene carbonate and fluorinated ethylene carbonate; and aromatic compounds, such as biphenyl, biphenyl derivatives, and cyclohexyl benzene. While the addition of such additives to the electrolyte is optional, where used, the additives may be used at an effective concentration. The effective concentration, depending on the additive or mixture of additives to be used, may range from 0.01 wt % to 15 wt %, from 0.01 wt % to 12 wt %, or from 0.01 wt % to 10 wt %. In some embodiments, the additive, or mixture of additives is added to the electrolyte up to about 6 wt %.

In another aspect, an electrochemical device is provided which includes any of the above electrolytes in addition to an anode; a cathode; and a separator. In some embodiments, the electrochemical device is a secondary electrochemical cell.

Anodes for such secondary electrochemical cells can include an anode active material selected from Groups IA, IIA, or IIIB of the Periodic Table of Elements, including the alkali metals lithium, sodium, potassium, etc. In one embodiment, the anode active material includes lithium. In such devices the anode may include graphite, amorphous carbon, $Li_4Ti_5O_{12}$, tin alloys, silicon alloys, intermetallic compounds, lithium metal, or mixtures of any two or more thereof. Suitable graphitic materials include natural graphite, artificial graphite, graphitized meso-carbon microbeads (MCMB), and graphite fibers, as well as any amorphous carbon materials.

In some embodiments, the anode active material includes a carbon-based material such as graphite, due to its relatively high lithium-retention capacity. Regardless of the form of the carbon, fibers of the carbonaceous material may be used in some embodiments, because they have excellent mechanical properties which permit them to be fabricated into rigid electrodes that are capable of withstanding degradation during repeated charge/discharge cycling. Moreover, the high surface area of carbon fibers allows for rapid charge/discharge rates. In some embodiments, the anode active material includes meso-carbon microbeads (MCMB). In some embodiments, the anode active material is a mixture of graphite particles and silicon microparticles or nanoparticles.

In some embodiments, the anode is prepared by mixing an anode active material, conducting agent, binding agent, and a solvent. The conducting agent may be carbon black, and the binding agent may be a fluoro-resin powder such as polytetrafluoroethylene (PTFE), polyvinylidene fluoride (PVDF), polyethylenetetrafluoroethylene (ETFE), polyamides, polyimides, or mixtures of any two or more such resins. The solvent may be N-methylpyrrolidone, acetone, water, or the like. An anode plate may be prepared by coating and drying the anode active material composition directly on a current collector, or the anode plate may be obtained by casting the anode active material composition on a separate support, and then laminating an anode active material film exfoliated from the support to the current collector.

According to some embodiments, the current collector may include copper, stainless steel, titanium, tantalum, platinum, gold, aluminum, nickel, cobalt nickel alloy, highly alloyed ferritic stainless steel containing molybdenum and chromium; or nickel-, chromium-, or molybdenum-containing alloys. The current collector is a foil or screen and the anode active material is contacted with the current collector by casting, pressing, or rolling the mixture thereto. The amounts of the anode active material, conducting agent, binding agent, and solvent may be within ranges conventionally used in the art.

Suitable cathodes include those such as, but not limited to, a lithium metal oxide, spinel, olivine, carbon-coated olivine, $LiFePO_4$, $LiCoO_2$, $LiNiO_2$, $LiNi_{1-x}CO_yMet_zO_2$, $LiMn_{0.5}Ni_{0.5}O_2$, $LiMn_{0.3}CO_{0.3}Ni_{0.3}O_2$, $LiMn_2O_4$, $LiFeO_2$, $Li_{1+x}Ni_\alpha Mn_\beta CO_\gamma Met'_\delta O_{2-z}F_{z'}$, $A_nB_2(XO_4)_3$ (NASICON), vanadium oxide, lithium peroxide, sulfur, polysulfide, a lithium carbon monofluoride (also known as LiCFx), or mixtures of any two or more thereof, where Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, or Zn; B is Ti, V, Cr, Fe, or Zr; X is P, S, Si, W, or Mo; where for the general cathode formulas $0 \leq x \leq 0.3$, $0 \leq y \leq 0.5$, $0 \leq z \leq 0.5$; $0 \leq x' \leq 0.4$, $0 \leq \alpha \leq 1$, $0 \leq \beta \leq 1$, $0 \leq \gamma \leq 1$, $0 \leq \delta \leq 0.4$, and $0 \leq z' \leq 0.4$; and $0 \leq n' \leq 3$. According to some embodiments, the spinel is a spinel manganese oxide with the formula of $Li_{1+x}Mn_{2-z}Met'''_yO_{4-m}X'_n$, wherein Met''' is Al, Mg, Ti, B, Ga, Si, Ni, or Co; X' is S or F; and where for the general cathode formulas $0 \le x \le 0.3$, $0 \le y \le 0.5$, $0 \le z \le 0.5$, $0 \le m \le 0.5$ and $0 \le n \le 0.5$. In other embodiments, the olivine has a formula of $Li_{1+x}Fe_{1-z}Met''_yPO_{4-m}X'_n$, wherein Met'' is Al, Mg, Ti, B, Ga, Si, Ni, Mn or Co; X' is S or F; and wherein $0 \le x \le 0.3$, $0 \le y \le 0.5$, $0 \le z \le 0.5$, $0 \le m \le 0.5$ and $0 \le n \le 0.5$.

In another aspect, a cathode active material composition is prepared by mixing a cathode active material, a conducting agent, a binding agent, and a solvent, in the same manner as for the anode plate. A cathode plate may be manufactured by coating the cathode active material composition directly on an aluminum current collector and then drying the composition. Alternatively, the cathode plate may be manufactured by casting the cathode active material composition on a separate support, and then laminating a film, which is exfoliated from the support, onto the aluminum current collector. A plasticizer may be added to the anode active material composition and the cathode active material composition, to form pores within the anode and cathode plates.

In yet another aspect, an electrochemical device is provided that includes a cathode; an anode; and a non-aqueous electrolyte. In one embodiment, the electrochemical device is a lithium secondary battery. In some embodiments, the secondary battery is a lithium battery, a lithium-ion battery, a lithium-sulfur battery, a lithium-air battery, a sodium ion battery, or a magnesium battery. In some embodiments, the electrochemical cell is a capacitor. In some embodiments, the capacitor is an asymmetric capacitor or supercapacitor. In some embodiments, the electrochemical cell is a primary cell. In some embodiments, the primary cell that is a lithium/$MnO_2$ battery or Li/poly(carbon monofluoride) battery. In some embodiments, the electrochemical cell is a solar cell.

In some embodiments, a secondary cell is prepared using electrolytes which include the carbonate-linked silane or siloxanes described above. Such secondary cells may also include a separator to provide physical segregation between the anode and cathode active electrodes. The separator is an electrically insulative material to prevent an internal electrical short circuit between the electrodes. It also is chemically unreactive with the anode and cathode active materials and chemically unreactive with and insoluble in the electrolyte. In addition, the separator material has a degree of porosity sufficient to allow flow therethrough of the electrolyte during the electrochemical reaction of the cell. The form of the separator typically is a sheet that is placed between the anode and cathode. Such is the case when the anode is folded in a serpentine-like structure with a plurality of cathode plates disposed intermediate between the anode folds and received in a cell casing, or when the electrode combination is rolled or otherwise formed into a cylindrical "jellyroll" configuration.

Battery separators may be a microporous polymer film. Examples of polymers for forming films include: nylon, cellulose, nitrocellulose, polysulfone, polyacrylonitrile, polyvinylidene fluoride, polypropylene, polyethylene, polybutene, or co-polymers or blends of any two or more such polymers. In some instances, the separator is an electron beam treated micro-porous polyolefin separator. The electron treatment can improve the deformation temperature of the separator and can accordingly enhance the high temperature performance of the separator. In some embodiments, the porous separator includes fabrics woven from fluoropolymeric fibers of polyethylenetetrafluoroethylene and polyethylenechloro-trifluoroethylene used either alone or laminated with a fluoropolymeric microporous film. Other suitable separator materials include non-woven glass, polypropylene, polyethylene, glass fiber materials, ceramics, and a polytetrafluoroethylene membrane commercially available under the designation ZITEX (Chemplast Inc.), a polypropylene membrane commercially available under the designation CELGARD (Celanese Plastic Company, Inc.), a membrane commercially available under the designation DEXIGLAS (C. H. Dexter, Dive., Dexter Corp.), or a polyethylene membrane commercially available from Tonen Chemical Corp. Additionally, or alternatively, the separator can be a shut-down separator. The shut-down separator can have a trigger temperature above 130° C. to permit the electrochemical cells to operate at temperatures up to 130° C.

Batteries incorporating the non-aqueous electrolytes are not limited to particular shapes. Such batteries may take any appropriate shape such as cylindrical shape, a coin shape, and a square shape. The batteries also are not limited to particular capacities, and can have any appropriate capacity for both small appliances and power storage or electric cars. A unit battery having a structure of cathode/separator/anode, a bi-cell having a structure of cathode/separator/anode/separator/cathode, or a battery stack including a plurality of unit batteries may be formed using above-described lithium secondary battery including the electrolyte, cathode, anode and separator. Lithium secondary batteries may be formed in various types such as cylindrical and pouch types in addition to the rectangular type.

In various embodiments, the electrolyte may be a liquid, a gel, or a solid. For instance, the electrolyte can include a porous phase that absorbs a liquid electrolyte. The porous phase can provide the structure needed for the electrolyte to be a gel or solid. The porous phase can include a co-polymer and one or more silicon compounds such as a silane and/or a siloxanes. Suitable silanes and siloxanes include, but are not limited to, the polysiloxanes, tetrasiloxanes, trisiloxanes, and disiloxanes disclosed above. The co-polymer and the one or more silicon compounds can be microphase-separated in the porous phase. The liquid electrolyte can include one or more of the above salts dissolved in a liquid solvent. The liquid solvent can include one or more of the above organic solvents and/or one or more of the above siloxanes and/or one or more of the above silanes.

In some other embodiments, the electrolyte includes an aprotic gel polymer carrier/solvent. Suitable gel polymer carrier/solvents include polyethers, polyethylene oxides, polyimides, polyphosphazines, polyacrylonitriles, polysiloxanes, polyether grafted polysiloxanes, derivatives of the foregoing, copolymers of the foregoing, cross-linked and network structures of the foregoing, blends of the foregoing, and the like, to which is added an appropriate ionic electrolyte salt. Other gel-polymer carrier/solvents include those prepared from polymer matrices derived from polypropylene oxides, polysiloxanes, sulfonated polyimides, perfluorinated membranes (Nafion resins), divinyl polyethylene glycols, polyethylene glycol-bis-(methyl acrylates), polyethylene glycol-bis(methyl methacrylates), derivatives of the foregoing, copolymers of the foregoing, cross-linked and network structures of the foregoing.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXAMPLES

Example 1

Synthesis of 1NMCB (1)

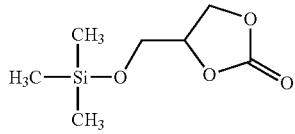

Chlorotrimethylsilane (12.2 g, 0.112 mol) was added dropwise to a solution of 4-(hydroxymethyl)-1,3-dioxolan-2-one (12.0 g, 0.102 mol) and triethylamine (11.3 g. 0.112 mol) in THF (100 mL). The crude product was filtered before volatiles were removed by Kugelrohr distillation. The product was then dissolved in toluene and washed with several small portions of water (approximately 8 times). The toluene was removed under reduced pressure and the product was then fractionally distilled. The product was recovered as a clear colorless liquid (yield=79%). $^1$H-NMR 1NMCB (500 MHz, CDCl$_3$), δ (ppm) 4.73 (m, 1H, CCH(C)O), 4.46 (dd, J=8.0, 8.0 Hz, 1H, CCHaO), 4.39 (dd, J=6.0, 8.0 Hz, 1H, CCHbO), 3.86 (dd, J=3.5, 11.5 Hz, 1H, SiOCHaC), 3.69 (dd, J=3.0, 12.0 Hz, 1H, SiOCHbC), 0.12 (s, 9H, SiCH$_3$). $^{13}$C-NMR 1NMCB (CDCl$_3$), δ (ppm) 155 (CO), 76 (CCH(C)O), 66 (SiOCH$_2$C), 62 (CCH$_2$O), -1 (SiCH$_3$). $^{29}$Si-NMR (CDCl$_3$), δ (ppm) 20.7.

Example 2

Synthesis of a siloxane di-carbonate (2)

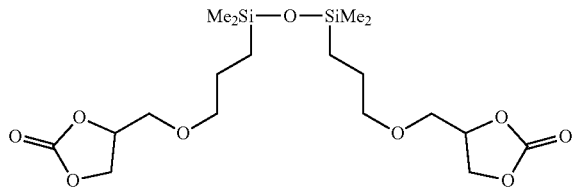

4-[(2-Propenyloxy)methyl]-1,3-dioxolan-2-one (76.4 g, 0.447 mol) was added to 1,1,3,3-tetramethyldisiloxane (25.0 g, 0.186 mol), and dried, distilled toluene (200 mL) in the presence of Karstedt's catalyst solution (0.20 g, 8.4×10$^{-4}$ mol) and heated to 75° C. overnight. Unreacted starting material was removed from the final product by vacuum distillation. The product, 2, was then purified by Kugelrohr distillation to yield a clear colorless liquid (yield 80%). $^1$H-NMR (CDCl$_3$), δ(ppm) 4.75 (CCH(C)O), 4.23-4.48 (CCH$_2$O), 3.23-3.65 (SiOCH$_2$C), 1.53 (SiCCH$_2$C), 0.39 (SiCH$_2$C), -0.03 (SiCH$_3$). $^{13}$C-NMR (CDCl$_3$), δ(ppm) 154.9 (CO), 75.5 (CCH$_2$O), 74.3 (CCH(C)O), 69.4 (CCH$_2$O), 66.2 (CCH$_2$O), 23.5 (CCH$_2$C), 13.9 (SiCH$_2$C), 0.2 (SiCH$_3$). $^{29}$Si-NMR (CDCl$_3$), δ(ppm) 6.95 (SiC(CH$_3$)$_2$O).

Example 3

Synthesis of a tri-siloxane carbonate (3)

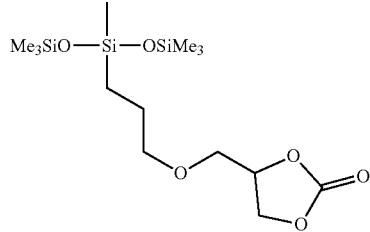

4-[(2-Propenyloxy)methyl]-1,3-dioxolan-2-one (19.3 g, 0.113 mol) was added to 1,3-bis(trimethylsiloxy)-1,3-methylsilane (25.0 g, 0.113 mol), and toluene (75 mL) in the presence of Karstedt's catalyst solution (0.10 g, 4.2×10$^{-4}$ mol) and heated to 75° C. overnight. The product, 3, was fractionally distilled to yield a clear colorless liquid. $^1$H-NMR (CDCl$_3$), δ(ppm) 4.77 (CCH(C)O), 4.31-4.48 (CCH$_2$O), 3.41-3.61 (SiOCH$_2$C), 1.53 (SiCCH$_2$C), 0.39 (SiCH$_2$C), 0.04 (Si(CH$_3$)$_3$), -0.04 (SiCH$_3$). $^{13}$C-NMR (CDCl$_3$), δ(ppm) 154.9 (CO), 75.1 (CCH$_2$O), 74.5 (CCH(C) O), 69.5 (CCH$_2$O), 66.2 (CCH$_2$O), 23.2 (CCH$_2$C), 13.3 (SiCH$_2$C), 1.7 (Si(CH$_3$)$_3$), 0.5 (SiCH$_3$) $^{29}$Si-NMR (CDCl$_3$), δ(ppm) 6.25 (Si(CH$_3$)$_3$), -22.96 Si(CH$_3$).

Example 4

Synthesis of 4

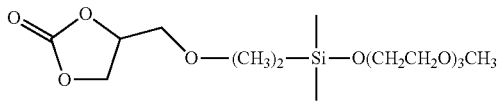

The synthesis of 4 maybe carried out by one of two alternatives. The first proceeds by initially attaching the glycol moiety, and the second by initially attaching the carbonate moiety to the silicon. The first alternative begins with a solution of tri(ethylene glycol)methyl ether (13.9 g, 0.0847 mol) and triethylamine (8.55 g, 0.0847 mol) in THF (100 mL) being added dropwise into the a solution of excess dimethyldichlorosilane (43.7 g, 0.339 mol) in THF (100 mL). After 4 h, the reaction mixture was filtered via a cannula to a dry, nitrogen flushed Schlenk flask. The solvent (THF) and unreacted dimethyldichlorosilane starting material was then removed to yield a yellow oil, which was subsequently redissolved in THF (50 mL). A solution of 4-(hydroxymethyl)-1,3-dioxolan-2-one (10.0 g, 0.0847 mol) and THF (50 mL) was slowly added to the solution. After the reaction had subsided, the solution was heated to reflux for 4 h. The solution was then cooled and filtered, before volatiles were removed under reduced pressure. The product was then purified by Kugelrohr distillation and characterized by NMR. $^1$H-NMR (CDCl$_3$), δ(ppm)$^1$H-NMR (CDCl$_3$), δ(ppm) 4.65 (CCH(C)O), 4.31-4.48 (CCH$_2$O), 3.35-3.65 (CH$_2$CH$_2$O, CCH$_2$O, OCH$_2$C), 3.25 (OCH$_3$), 1.47-1.58 (CCH$_2$C), 0.45-0.55 (SiCH$_2$C), 0.04 (SiCH$_3$). $^{13}$C-NMR (CDCl$_3$), δ(ppm) 154.9 (CO), 75.8 (CCH(C)O), 70.2-72.1 (CH$_2$CH$_2$O) 65.5 (SiOCH$_2$C), 61.8 (SiOCH$_2$C), 61.3 (CCH$_2$O), 58.7 (OCH$_3$), −3.7 (SiCH$_3$). $^{29}$Si-NMR (CDCl$_3$), δ(ppm) 0.6, −1.2, −2.8.

The second alternative: 4-[(2-Propenyloxy)methyl]-1,3-dioxolan-2-one (36.5 g, 0.253 mol), dimethylchlorosilane (20.0 g, 0.211 mol), Karstedt's catalyst solution (0.2 g, 8.40× 10$^{-4}$ mol), and toluene (100 mL) were stirred and heated to 75° C. After 24 h, a solution of tri(ethylene glycol)methyl ether (34.7 g, 0.211 mol) and triethylamine (21.3 g, 0.211 mol) in THF (100 mL) were added dropwise to the reaction mixture. After the reaction had subsided, the solution was heated to reflux for 3 h. The solution was then cooled and filtered, and volatiles were removed under reduced pressure. The product was then distilled via Kugelrohr to yield a clear colorless liquid (yield 69%). $^1$H-NMR (CDCl$_3$), δ(ppm) 4.65 (CCH(C)O), 4.31-4.48 (CCH$_2$O), 3.35-3.65 (CH$_2$CH$_2$O, CCH$_2$O, OCH$_2$C), 3.25 (OCH$_3$), 1.47-1.58 (CCH$_2$C), 0.45-0.55 (SiCH$_2$C), 0.04 (SiCH$_3$). $^{29}$Si-NMR (CDCl$_3$), δ(ppm) 17.4.

Example 5

By way of illustration, and in no way intended to be limiting, three illustrative cells, Cells 1, 2 and 3, were prepared. Cell 1 contained an electrolyte that included 1M LiPF$_6$ in 2-[2-[2-[2-methoxy]ethoxy]ethoxy]ethoxy trimethyl silane (1NM3), with 10 wt % 1NMCB, compound 1 above. Cell 2 was a control, prepared in the same manner, but without the 1NMCB. Cell 3 was prepared with 0.8M LiBOB in 1NM3.

The anode active material in the exemplary cells was graphite, a layered carbonaceous material. The anode was prepared from a slurry by kneading the graphite and a polyvinylidene fluoride (PVDF) binder together in N-methylpyrrolidinone (NMP) in a weight ratio of 80/8. The anode contained about 2 wt % of the graphite conducting carbon and about 8 wt % of the binder in the slurry. The anode slurry was then coated on both surfaces of a copper foil using wet-coating techniques and passed through a drier to remove the NMP. After drying, the anode was pressed to obtain a coating density of about 1.25 to about 1.79 grams per milliliter.

A cathode slurry was prepared by mixing LiNi$_{1/3}$Co$_{1/3}$Mn$_{1/3}$O$_2$, acetylene black, and PVDF binder in N-methylprolidinone (NMP), in a planetary mixer. The cathode contained about 84 wt % of the metal oxide, about 4 wt % of the acetylene black, and about 4 wt % of the PVDF in the solid contents of the slurry by weight. The cathode slurry was then coated onto an aluminum current collector followed by drying and roll pressing of the electrode to obtain a coating density of about 3.0 to about 3.8 g/ml. Although PVDF was used as a binder in the cathodes and anodes of the exemplary cells, any polymer that is stable at less than 2 volts versus lithium and is insoluble in the electrolyte could be used.

The anode, cathode, and a micro-porous polyolefin separator of polyethylene were stacked to form an electrode assembly. The assembly was then placed into a 2032 type button cell, and activated by additional of the electrolyte.

Example 6

Figure 3:
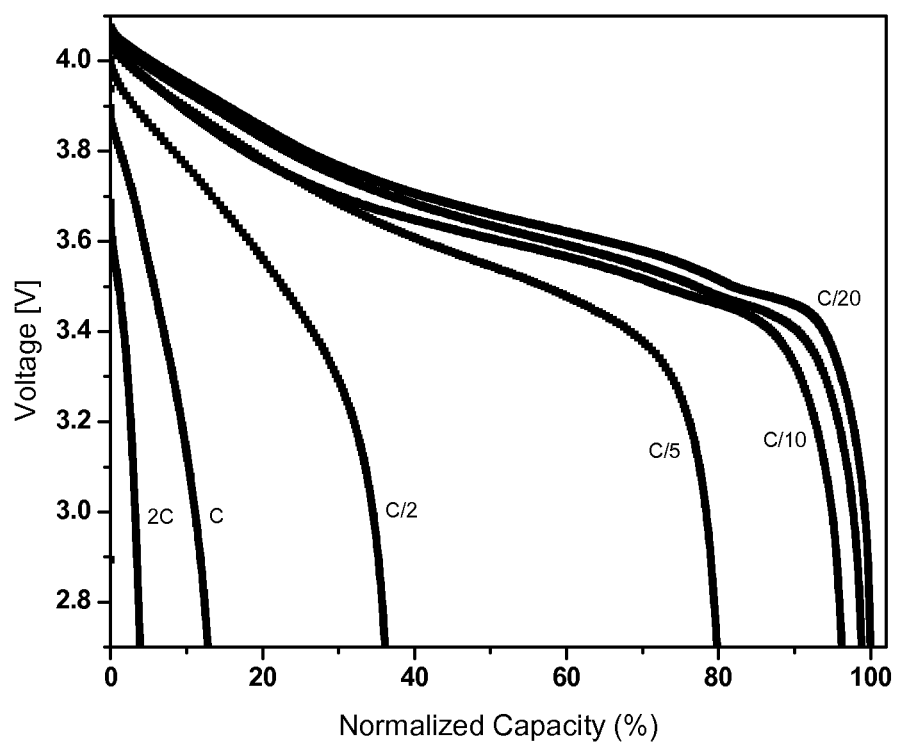
FIGS. 3A and B are graphs illustrating the rate capabilities of Cells 1 (FIG. 3A) and 2 (FIG. 3B), according to the examples, where the cells were charged to 4.2V with a constant current of C/10, then discharged to 2.7V with the current rates of C/20, C/10, C/5, C/2, C, 2C, and C/10 at 25° C.
Figure 3:
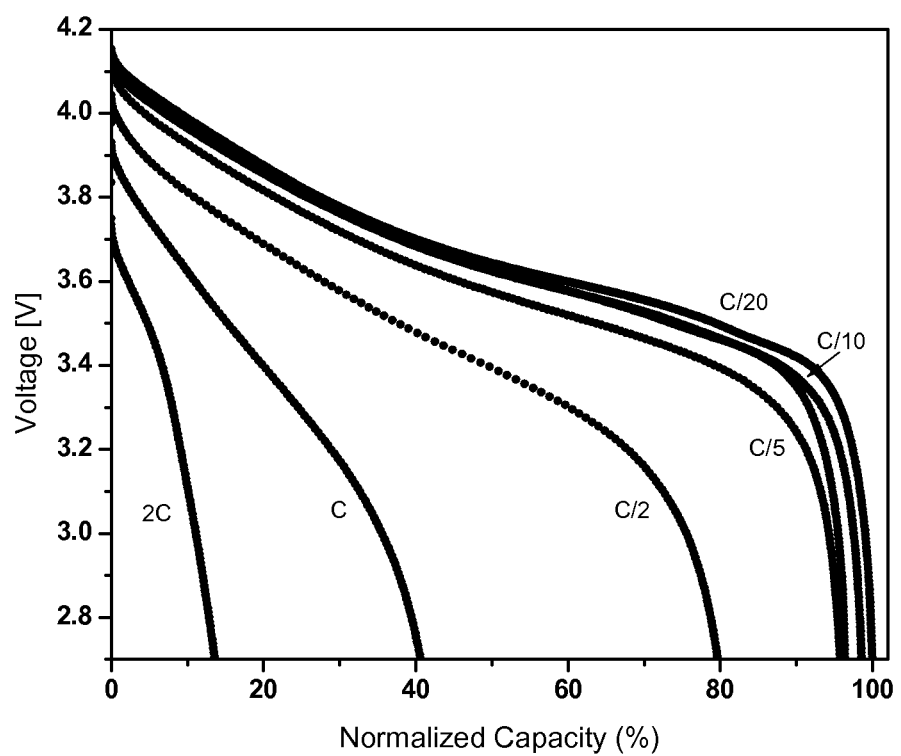

Cells 1 and 2 were charged to 4.2V at a C/5-rate with a cut-off current at C/20-rate, and discharged to 2.7V at a C/5-rate. FIGS. 3A and 3B depict the voltage profiles for cells 1 and 2, respectively. Cell 1, containing the silane-carbonate, had a much higher discharge capacity and increased coulomb efficiency compared to the additive-free Cell 2.

Figure 4:
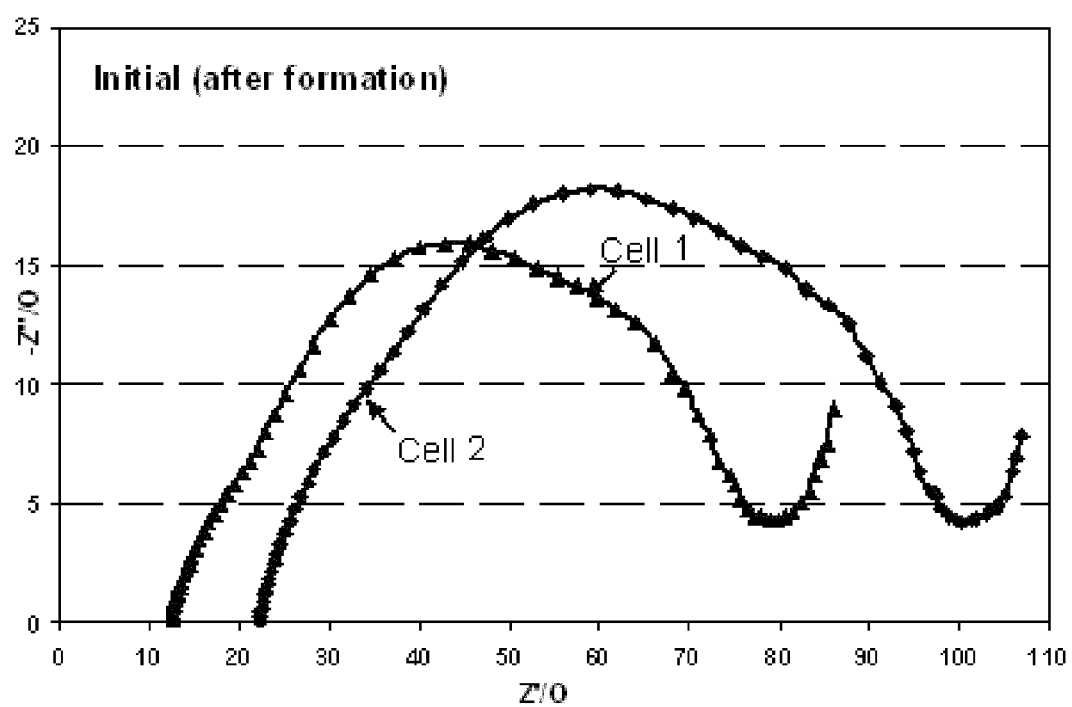
FIG. 4 is a graph illustrating the initial AC impedance of Cells 1 and 2, according to the examples.

FIG. 4 depicts the cycling performance of Cell 1 in comparison to Cell 2. It can be seen that Cell 1 shows superior cycling performance compared to the additive-free, Cell 4, which showed extremely poor cycling performance.

Figure 5:
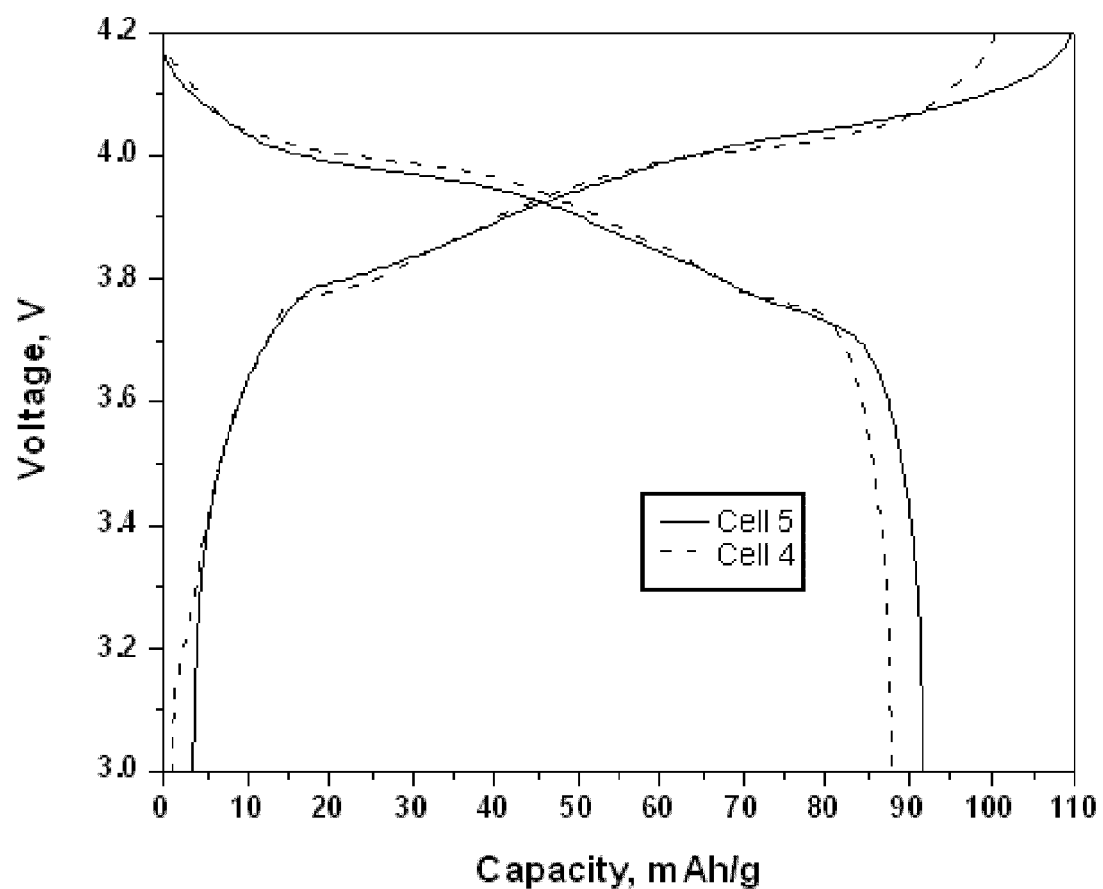
FIG. 5 is a graph illustrating the first charge/discharge voltage profiles of Cells 4 and 5, according to the examples, where the cells were cycled between 3.0 V and 4.2 V at 25° C. with a constant current of C/5.

FIG. 5 depicts the discharge rate capacity of Cells 1 and 3. To obtain the data, the cells were charged to 4.2V at a C/10-rate with a cut off current at C/20-rate, and discharged to 2.7V at a rate of C/20, C/10, C/5, C/2, C, 2C. To obtain the full discharge capacity of the cells, slow discharge rates (C/20) were used. Cell 1 exhibited nearly 95.8% of recoverable capacity, which is greatly superior to the approximately 79.8% of recoverable capacity of additive-free Cell 3.

Figure 6:
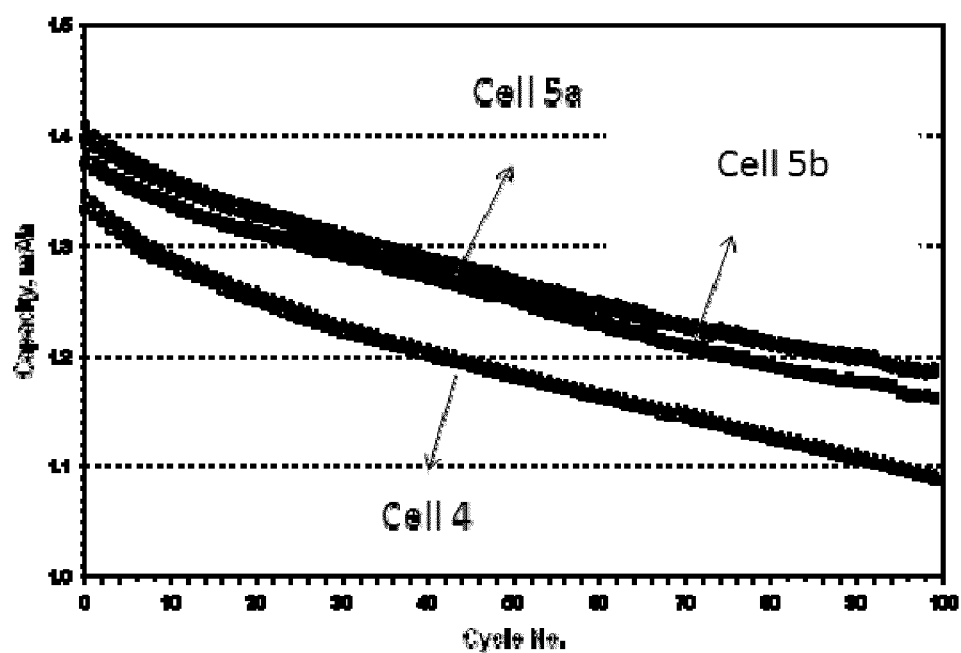
FIG. 6 is a graph illustrating the capacity retention of Cells 4 and 57 (a and b—2 runs), according to the examples, where the cells were cycled between 3.0 V and 4.2 V at 25° C. with a constant current of C/5.

FIG. 6 depicts the initial AC impedance of Cells 1 and 2 after a single cycle. The AC impedance of Cell 1 is smaller than of additive-free Cell 2. Without being bound by theory, it is believed that the decrease in the impedance was due to a more robust SEI layer formed in Cell 1, that that of Cell 2. Cell 1 is able to efficiently suppress side reactions and reduce the impedance growth during the charging. FIG. 6 also illustrates that the bulk resistance of Cell 1 is smaller than that of additive-free Cell 2. This believe to be due to the electrolyte ionic conductivity increasing with the addition of the high dielectric constant silane-carbonate (1NMCB) compound.

Example 7

The performance of the co-solvent electrolyte in LiMnO$_2$ (LMO)/graphite cells was evaluated using 2032 type coin cells with an active area of 1.6 cm$^2$. The positive electrode was a laminate of 84 wt % LMO with a 11.5 mg/cm$^2$ loading rate. The negative electrode was a laminate of 90 wt % graphite with a 5.0 mg/cm$^2$ loading rate. Cell 4 included the negative electrode, a microporous polypropylene separator (Celgard 2325), the positive electrode, and an electrolyte of 1.2M LiPF$_6$ in ethylene carbonate/ethylene methyl carbonate (EC/EMC) in a ratio of 3:7. Cell 5 included the same construction, however the electrolyte used was 1.0M LiPF$_6$ in 1NMBC/1NM2 (2:8), a silane-based electrolyte. As used herein, 1NM2, is an abbreviation for 3-[2-[2-methoxy-ethoxy]-ethoxy]-1,1,1-trimethylsiloxane or Me(OCH$_2$CH$_2$)$_2$OS-iMe$_3$. The cells were cycled between 3.0V and 4.2V with a constant current of C/5 at 25° C.

FIG. 7 is a comparison of the first charge/discharge profiles of Cells 4 and 5 cycled between 3.0 V and 4.2 V at 25° C. with a constant current of C/5. The reversible discharge capacity is larger for Cell 5 (91.6 mAh/g) as compared to Cell 4 (87.7 mAh/g), a 4.4% increase. This is a significant increase, over purely carbonate based systems.

In FIG. 8, the capacity retention of Cells 4 and 5 (a and b—2 runs) is illustrated over cycling between 3.0 V and 4.2 V at 25° C., with a constant current of C/5. Cell 4 loses about 18.5% of its initial discharge capacity after 100 cycles, while only 16.2% is lost for Cell 5. This is a significant increase, over purely carbonate based systems.

While certain embodiments have been illustrated and described, it should be understood that changes and modifications can be made therein in accordance with ordinary skill in the art without departing from the invention in its broader aspects as defined in the following claims.

What is claimed is:

1. A non-aqueous electrolyte comprising:
   an alkali metal salt;
   from 0.01 wt % to 10 wt % vinylene carbonate, fluorinated ethylene carbonate, biphenyl, or cyclohexyl benzene;
   an aprotic solvent; and
   a siloxane compound represented by Formula III:

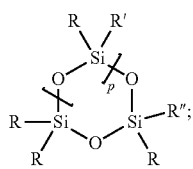

Formula III wherein:
the siloxane compound is present at a concentration from about 0.5 to about 5 weight percent of the electrolyte;
the alkali metal salt is present at a concentration from about 0.01 M to about 2 M;
each R' is represented by Formula I-A:

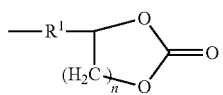

I-A each R" is represented by R, Formula I-A, or I-B;

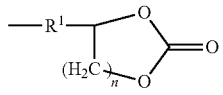

I-A

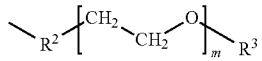

I-B each R is individually H, an alkyl group, an alkenyl group, an alkynyl group, an alk(poly)enyl group, an alk(poly)ynyl group, or an aryl group;
$R^1$ is a fluorinated alkylene group, an alkylene oxide group, a fluorinated alkylene oxide group, an ether group, or a fluorinated ether group;
$R^2$ is a bond, a fluorinated alkylene group, an alkylene oxide group, a fluorinated alkylene oxide group, an ether group, or a fluorinated ether group;
$R^3$ is an alkyl group or an aryl group;
m is 0-15;
n is 1 or 2; and
p is 1, 2, or 3.

2. The non-aqueous electrolyte of claim 1, wherein $R^1$ is a fluorinated alkylene, fluorinated alkylene oxide, or fluorinated ether and $R^2$ is a bond, a fluorinated alkylene, fluorinated alkylene oxide, or fluorinated ether.

3. The non-aqueous electrolyte of claim 1, wherein the aprotic solvent comprises a silicon-based solvent or an organic solvent.

4. The non-aqueous electrolyte of claim 1, wherein the aprotic solvent comprises a cyclic carbonate, linear carbonate, dialkyl carbonate, aliphatic carbonxylate ester, γ-lactone, linear ether, cyclic ether, or a fluorinated carboxylate ester.

5. The non-aqueous electrolyte of claim 1, wherein the alkali metal salt comprises $Li[(C_2O_4)_2B]$, $Li(C_2O_4)BF_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, or a lithium alkyl fluorophosphate.

6. The non-aqueous electrolyte of claim 1, wherein the concentration of the alkali metal salt is from 0.5M to 2.0M.

7. An electrochemical cell comprising:
   a negative electrode intercalated with lithium;
   a positive electrode comprising an electrode active material which intercalates with lithium; and
   the non-aqueous electrolyte of claim 1.

8. The electrochemical cell of claim 7, wherein the negative electrode comprises graphite particles or silicon particles.

* * * * *